US012122460B2

(12) United States Patent
Enomoto et al.

(10) Patent No.: US 12,122,460 B2
(45) Date of Patent: Oct. 22, 2024

(54) BALL SCREW DEVICE AND VEHICLE STEERING APPARATUS USING SAME

(71) Applicant: HITACHI ASTEMO, LTD., Hitachinaka (JP)

(72) Inventors: Satoshi Enomoto, Hitachinaka (JP); Hiroshi Fujita, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 614 days.

(21) Appl. No.: 17/430,136

(22) PCT Filed: Mar. 29, 2019

(86) PCT No.: PCT/JP2019/014055
§ 371 (c)(1),
(2) Date: Aug. 11, 2021

(87) PCT Pub. No.: WO2020/202269
PCT Pub. Date: Oct. 8, 2020

(65) Prior Publication Data
US 2022/0097752 A1      Mar. 31, 2022

(51) Int. Cl.
*F16H 25/22*        (2006.01)
*B62D 3/08*         (2006.01)
(Continued)

(52) U.S. Cl.
CPC ................. *B62D 3/08* (2013.01); *B62D 5/04* (2013.01); *F16H 25/2214* (2013.01); *F16H 2025/2062* (2013.01); *F16H 2025/2081* (2013.01)

(58) Field of Classification Search
CPC ............. F16H 25/2219; F16H 25/2214; F16H 25/2223; F16H 25/2228; F16H 2025/2481
See application file for complete search history.

(56) References Cited

U.S. PATENT DOCUMENTS

| | | | |
|---|---|---|---|
| 10,035,536 B2* | 7/2018 | Yamazaki | ........... F16H 25/2214 |
| 2010/0242651 A1* | 9/2010 | Shirai | ................ F16H 25/2214 |
| | | | 74/424.83 |
| 2019/0077445 A1* | 3/2019 | Yoshida | ................ F16H 25/24 |

FOREIGN PATENT DOCUMENTS

| | | |
|---|---|---|
| JP | 2005-351341 | 12/2005 |
| JP | 2016-211697 | 12/2016 |
| JP | 2018-016193 | 2/2018 |

OTHER PUBLICATIONS

International Search Report, Date of mailing: May 28, 2019, 1 page.

* cited by examiner

*Primary Examiner* — Gregory Robert Weber
(74) *Attorney, Agent, or Firm* — Rankin, Hill & Clark LLP

(57) ABSTRACT

A ball screw device includes a screw shaft, a plurality of balls, a nut, a pair of guide members, and a transmission member. The nut has a pair of large-diameter portions and a small-diameter part between the two large-diameter portions. The two guide members are attachable to and detachable from an outer circumferential surface of the small-diameter portion in a radial direction and are located with a certain gap in the outer circumferential direction of the small-diameter portion. A fitting portion of the transmission member fits over the two large-diameter portions such that the fitting portion covers the two guide members while restricting radially outward displacements thereof. The fitting portion works with the small-diameter portion and the two guide members to define a circulation passage through which the balls are circulated. The transmission member is coupled to the nut.

15 Claims, 16 Drawing Sheets

(51) Int. Cl.
*B62D 5/04* (2006.01)
*F16H 25/20* (2006.01)

In ⟵⟶ Ot

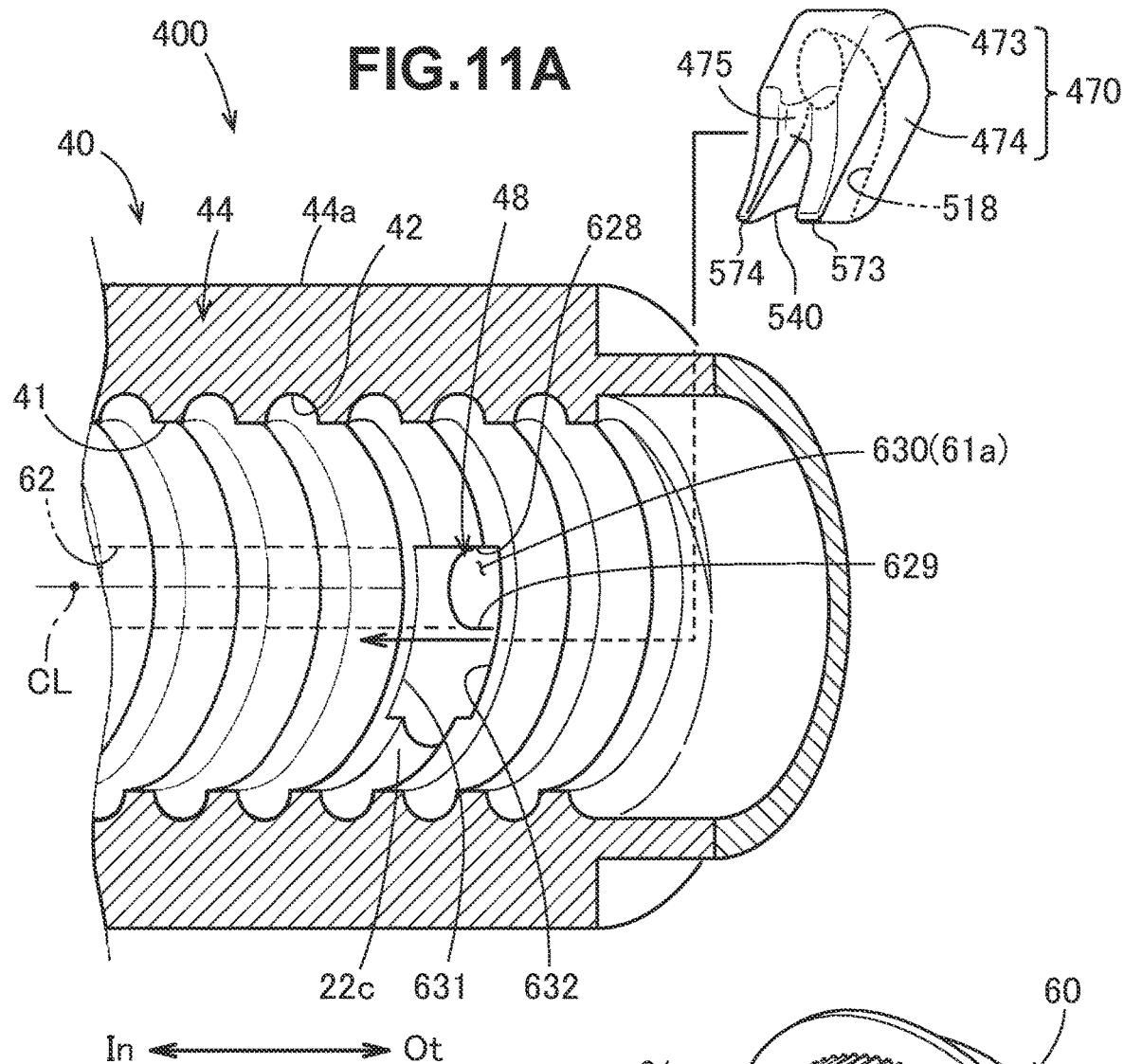
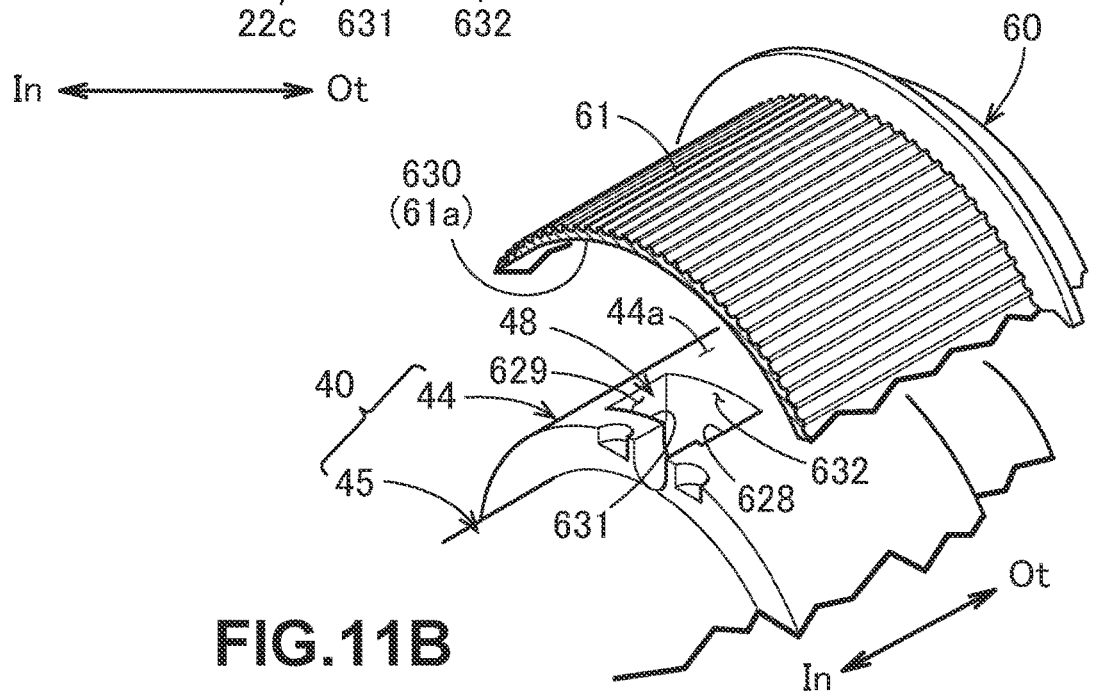

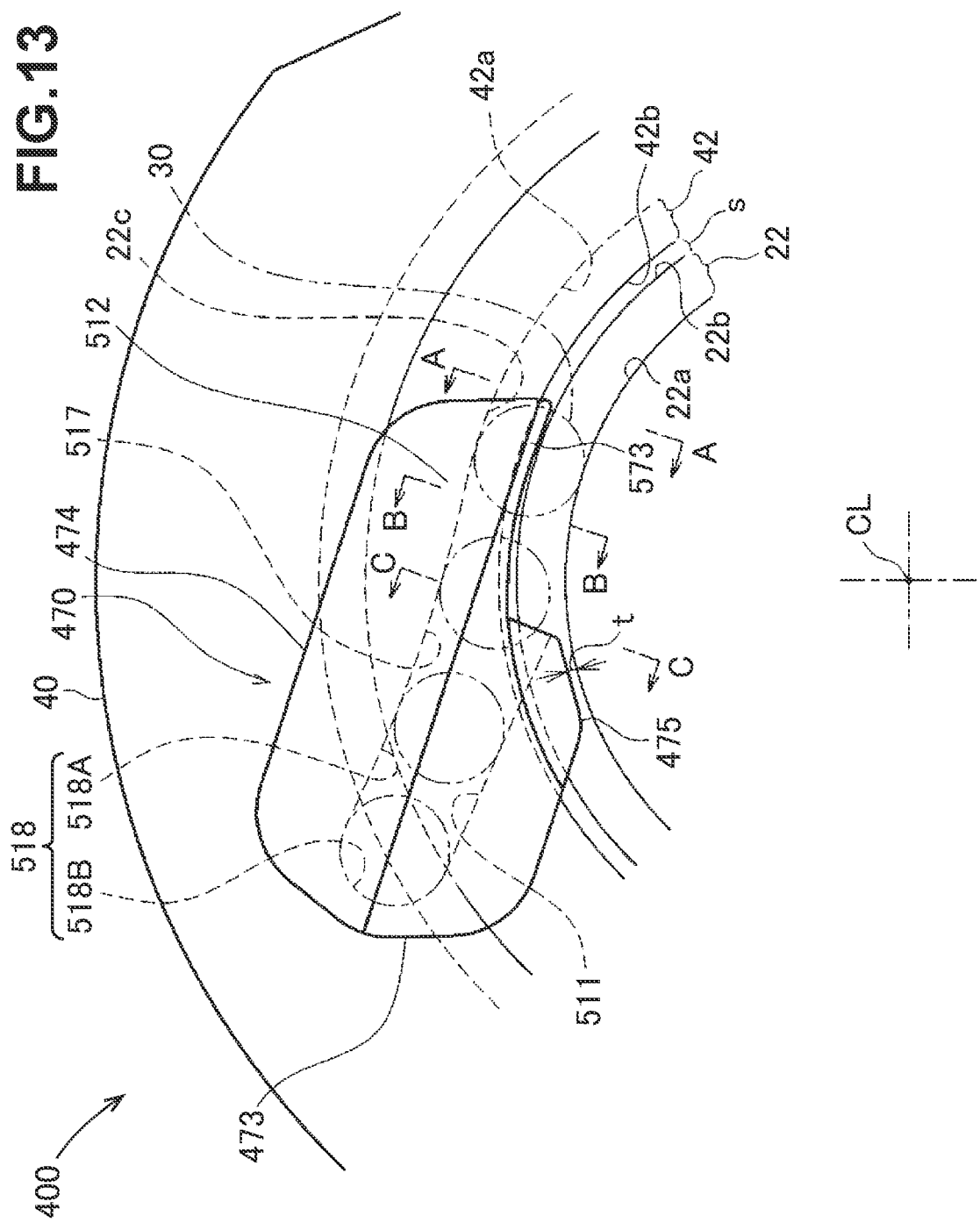

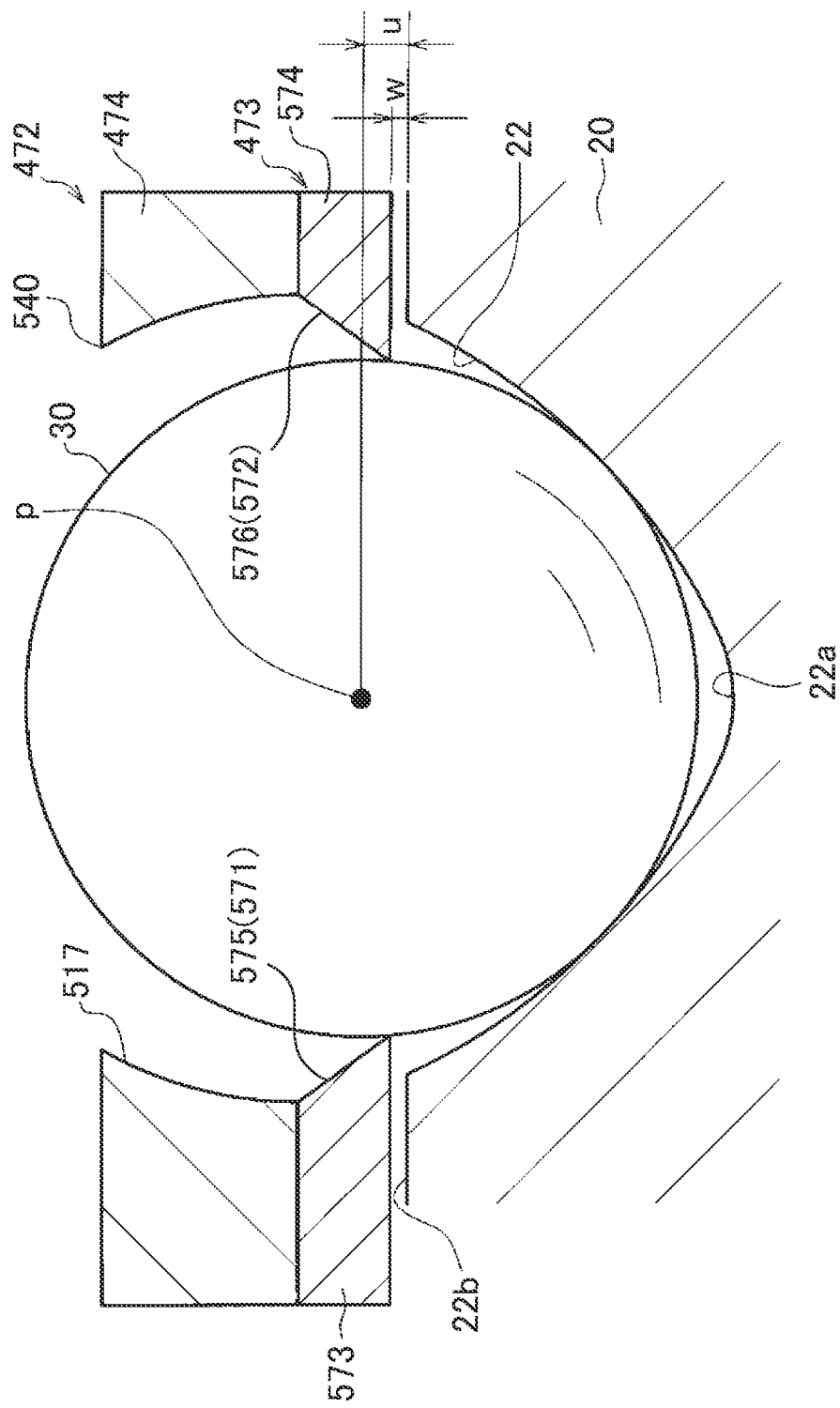

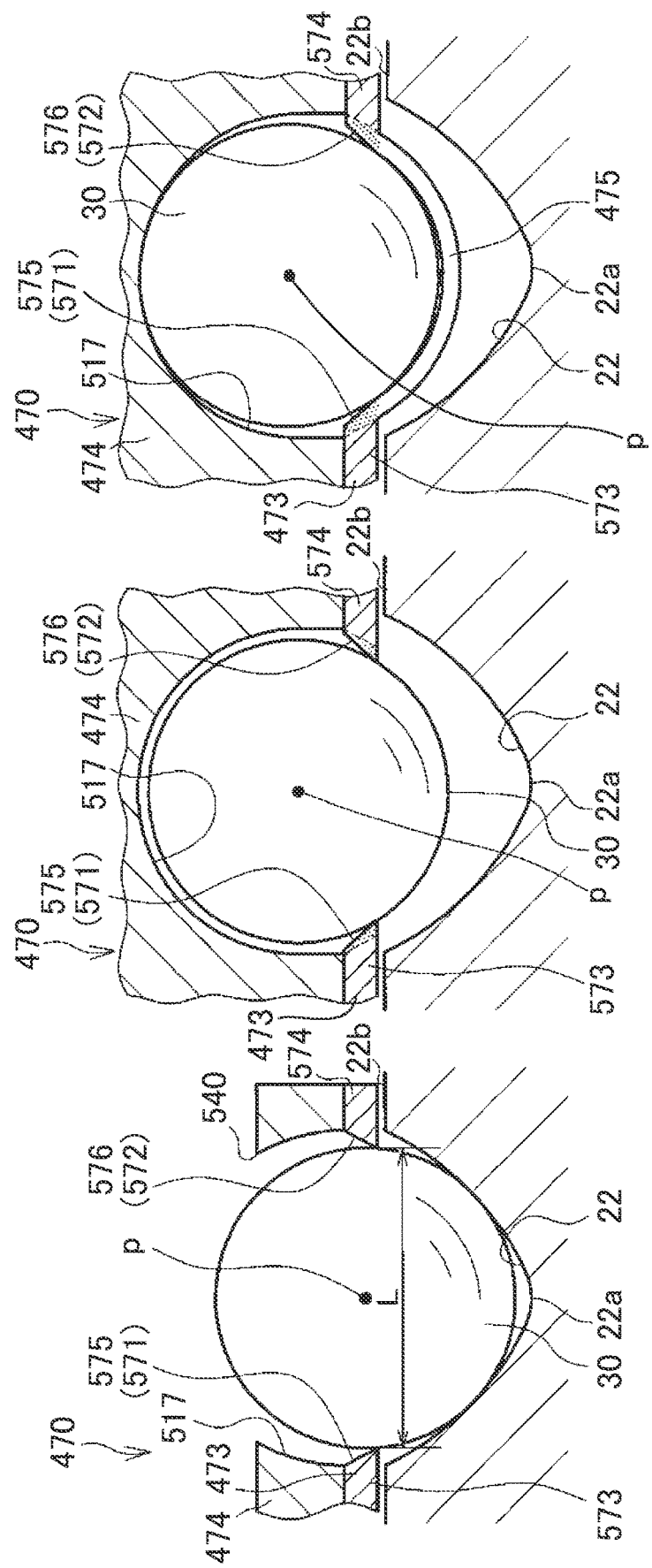

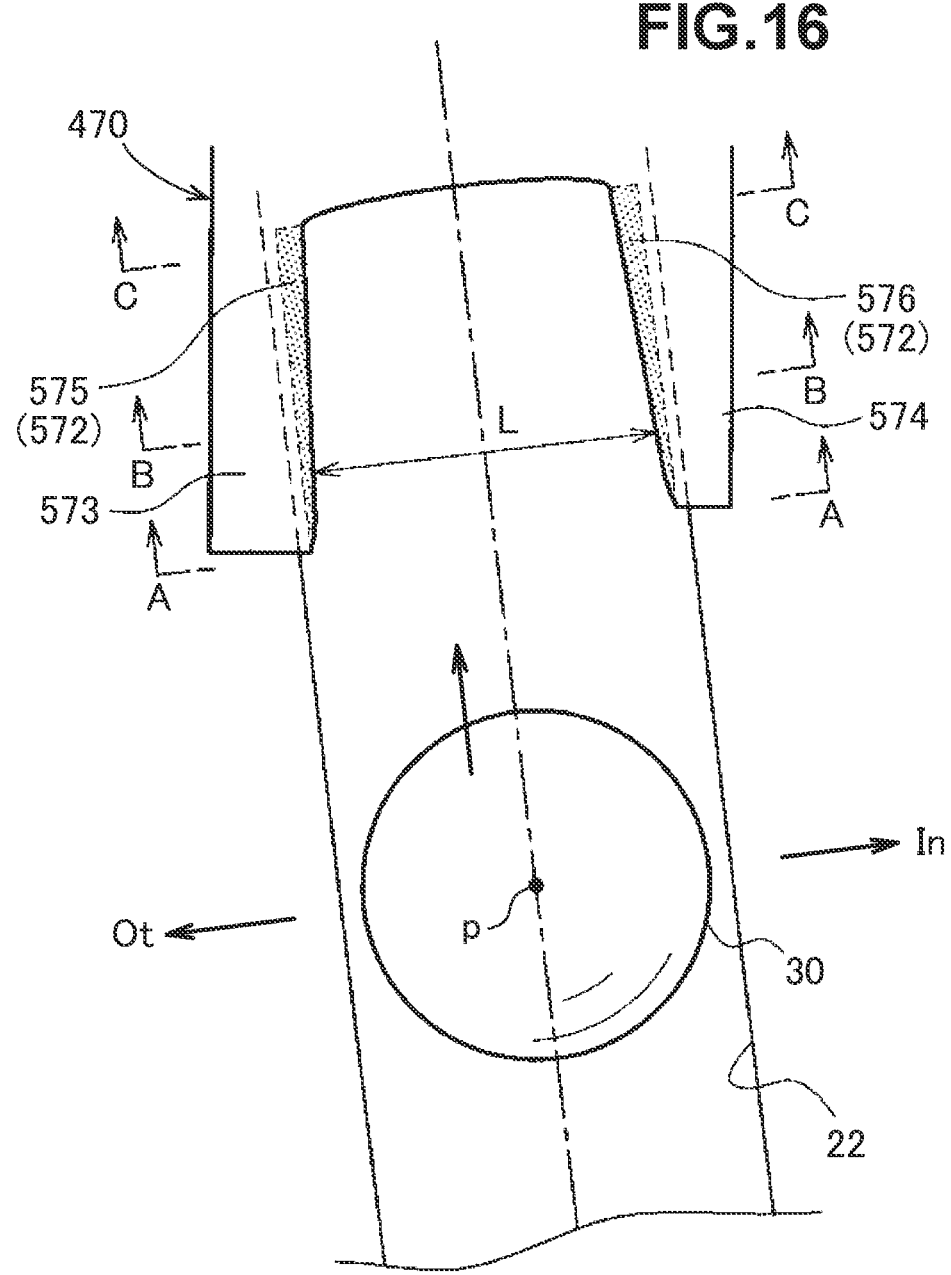

BALL SCREW DEVICE AND VEHICLE STEERING APPARATUS USING SAME

TECHNICAL FIELD

The present invention relates to an improvement to a ball screw device for converting a rotational motion into a linear motion and/or converting the linear motion into the rotational motion, and also relates to an improvement to a steering apparatus for a vehicle using this improved ball screw device.

BACKGROUND ART

A ball screw device includes a screw shaft, a plurality of balls, and a nut which is coupled to a threaded portion by the balls, and is used in, for example, in a vehicle steering apparatus. The portion where the screw shaft and the nut are opposed to each other has a screw-shaped space (screw groove) in which the balls rolls. The nut is coupled to the threaded portion by the balls that roll in the screw groove. The balls that roll in the screw groove circulate through a circulation passage. In recent years, developments that focus on the weight reduction of the ball screw device are promoted, and one example is known in, for example, Patent Literature Document 1.

In the ball screw device known in Patent Literature Document 1, a center portion of a nut in the longitudinal direction of the nut is a small-diameter portion that is thin and has a small-diameter, and therefore it is possible to reduce the weight of the nut. Each of opposite end portions of the nut in the longitudinal direction is a large-diameter portion which has an original large-diameter. A through hole extending along the axis of the nut is formed in each of the two large-diameter portions. As a pipe-shaped ball returning member is inserted in the through hole from one end of the nut, it is possible to pass the ball returning member between the two large-diameter portions. The ball returning member is adjacent to the outer peripheral surface of the small-diameter portion. A plurality of balls rolling in a screw groove circulate through a circulation passage in the ball returning member.

LISTING OF PRIOR ART REFERENCES

Patent Literature Documents

Patent Literature Document 1: JP2005-351341-A

SUMMARY OF THE INVENTION

Problems to be Solved by the Invention

Generally, a transmission member is attached to the nut of the ball screw device. Therefore, the diameter of the large-diameter portion of the nut is subject to the limitation of the size of the transmission member. On the other hand, the diameter of the small-diameter portion of the nut is subject to the limitation of the outer diameter of the screw groove between the screw shaft and the nut. In the ball screw device known in Patent Literature Document 1, a ball returning member (pipe) is inserted in the through hole from one end of the nut to dispose the ball returning member between the two large-diameter portions. The diameter of the through hole is the size of the outer diameter of the pipe. Therefore, there is a limitation to reducing the diameter of the large-diameter portion. This is a disadvantage in increasing the degree of freedom in the design of the ball screw device.

An object of the present invention is to provide a technique that can reduce the weight of the ball screw device while increasing the degree of freedom in design of the ball screw device.

Solution to the Problems

In accordance with the present invention, a ball screw device includes:

a screw shaft having a threaded portion on an outer peripheral surface thereof;

a plurality of balls which are positioned so as to be capable of rolling on the threaded portion;

a nut having a cylindrical configuration which is connected to the threaded portion by the balls, the nut including a pair of large-diameter portions located at opposite ends thereof in the axial direction, and a small-diameter portion integrally formed between the two large-diameter portions and having a smaller diameter than each of the two large-diameter portions;

a pair of guide members which can be attached to and detached from an outer peripheral surface of the small-diameter portion in a radial direction, positioned with a predetermined distance in the outer circumferential direction of the small-diameter portion, and extend between opposed end faces of the two large-diameter portions; and a transmission member having a fitting portion that can fit over the two large-diameter portions such that the fitting portion fitting over the two large-diameter portions covers the two guide members while regulating displacement of the two large-diameter portions in a radially outward direction, the transmission member configured to define a circulation passage for the balls in cooperation with the small-diameter portion and the two guide members, and connected to the nut such that a rotational force can be transmitted between the nut and the transmission member.

Advantages of the Invention

In the present invention, since the cylindrical nut utilizes the small-diameter portion to connect a pair of large-diameter portions located at the opposite ends in the axial direction to each other, the weight of the nut is reduced. In addition, in the present invention, the transmission member assembled to the nut is effectively utilized. The fitting portion of the transmission member covers a pair of guide members while regulating the displacement of the guide members in a radially outward direction relative to the nut. Therefore, the two guide members are not disengaged from the nut. Further, the circulation passage is defined by the fitting portion, the small-diameter portion, and the two guide members. A plurality of balls rolling on the threaded portion can circulate through the circulation passage. Therefore, the present invention can reduce the weight of the ball screw device while increasing the degree of freedom in design of the bail screw device.

BRIEF DESCRIPTION OF THE DRAWINGS

FIG. 11 is a set of views of the appearance of the ball screw device according to the fourth embodiment of the present invention and shows a state prior to assembling the end deflector to the nut (screw shaft is not shown).

FIG. 13 is a plan view useful to describe the nut and the end deflector viewed from the axial direction of the screw shaft of the ball screw device according to the fourth embodiment of the present invention.

FIG. 14 is a cross-sectional view of the end deflector and the threaded portion of the screw shaft of the ball screw device according to the fourth embodiment of the present invention.

FIG. 15 is a set of cross-sectional views useful to describe a movement of the ball that is lifted by ball lifting portions of the ball screw device according to the fourth embodiment of the present invention.

FIG. 16 is a plan exploded view useful to describe the threaded portion of the screw shaft of the ball screw device according to the fourth embodiment of the present invention when viewed from the radially outward direction.

MODE FOR CARRYING OUT THE INVENTION

Embodiments for carrying out the present invention will be described below based on the accompanying drawings.

First Embodiment

Figure 1:
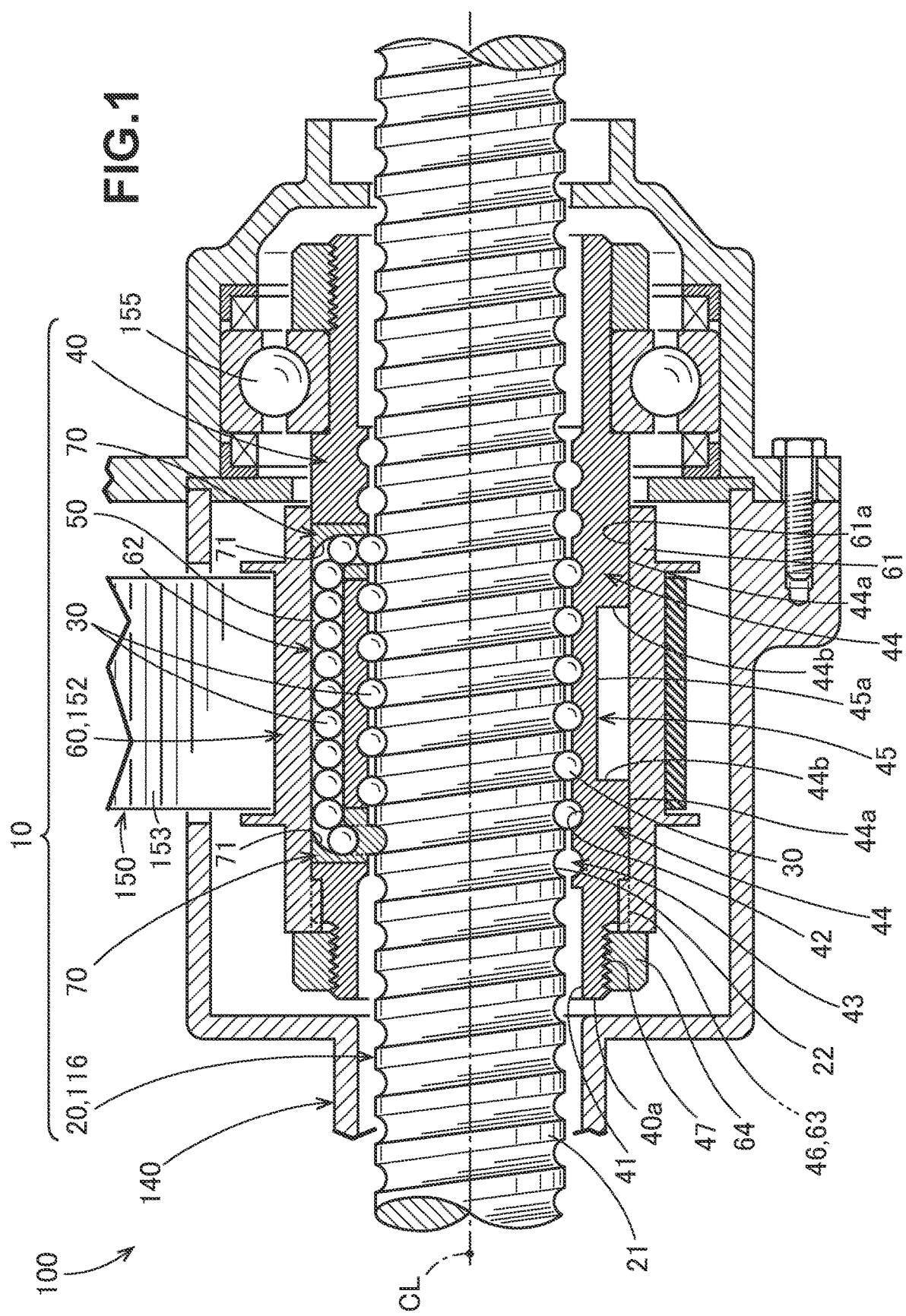
FIG. 1 is a cross-sectional view of a ball screw device according to a first embodiment of the present invention.

Referring to FIG. 1 to FIG. 5, a ball screw device 10 of a first embodiment will be described. As shown in FIG. 1, the ball screw device 10 is a conversion mechanism that can convert a rotational motion into a linear motion and/or convert the linear motion into the rotational motion. The ball screw device 10 includes a screw shaft 20, a plurality of balls 30, a nut 40, a pair of guide members 50 and 50, a transmission member 60, and a pair of end deflectors 70 and 70.

The screw shaft 20 has a screw portion (threaded portion) 22 on an outer peripheral surface 21. The balls 30 are positioned such that the balls can roll on the threaded portion 22.

The nut 40 is a cylindrical member, which is connected to the threaded portion 22 of the screw shaft 20 by the balls 30.

That is, the threaded portion 42 formed on the inner peripheral surface 41 of the nut 40, and the threaded portion 22 formed on the screw shaft 20 face each other to define a screw-like space 43 in which the balls 30 roll, i.e., a thread groove 43. The nut 40 is coupled with the threaded portion 22 by the balls 30 that roll in the thread groove 43.

Figure 2:
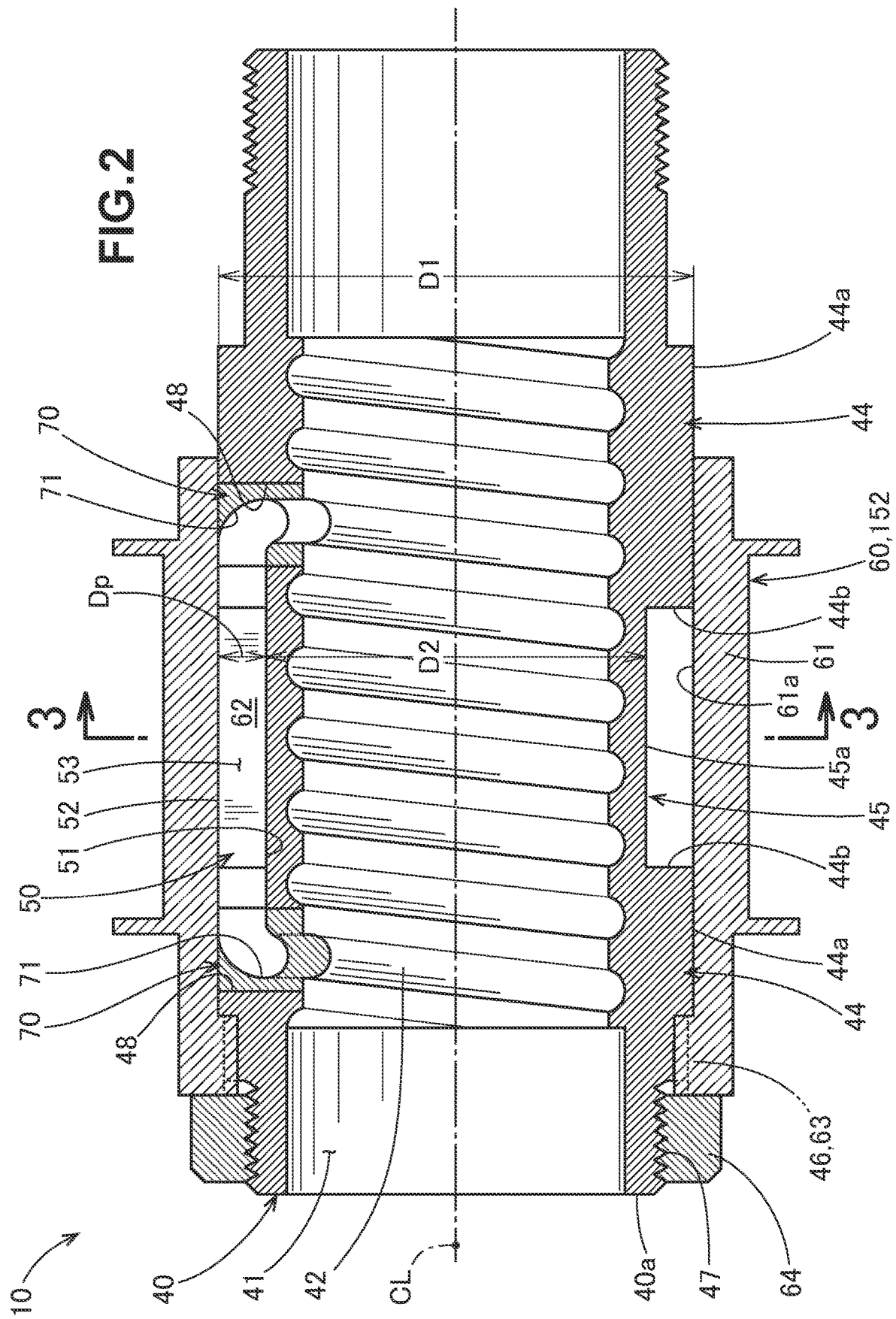
FIG. 2. is a cross-sectional view of a configuration in which a nut, a guide member, a transmission member and an end deflector, all of which are shown in FIG. 1, are assembled.
Figure 3:
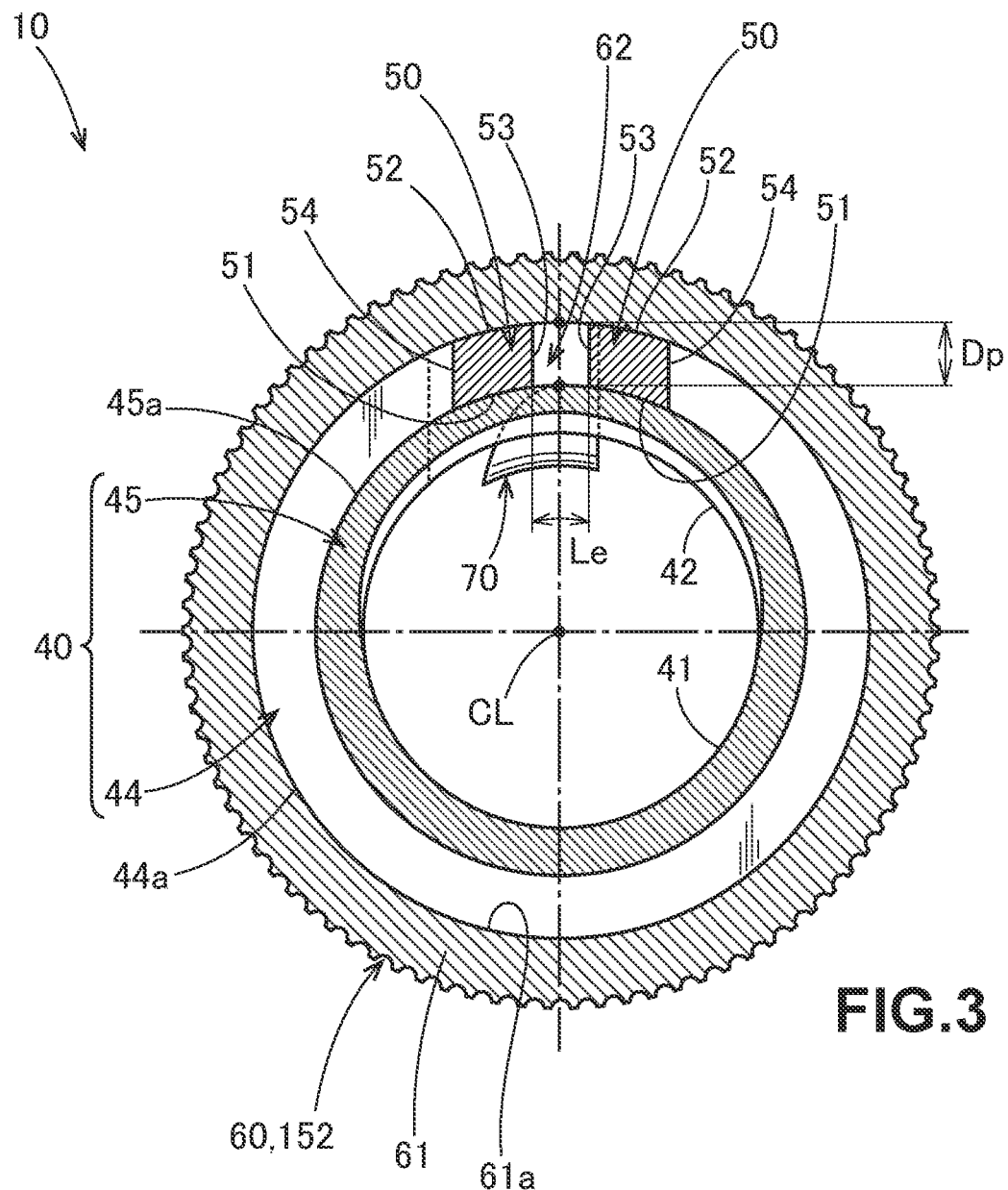
FIG. 3 is a cross-sectional view taken along the line 3-3 in FIG. 2.
Figure 4:
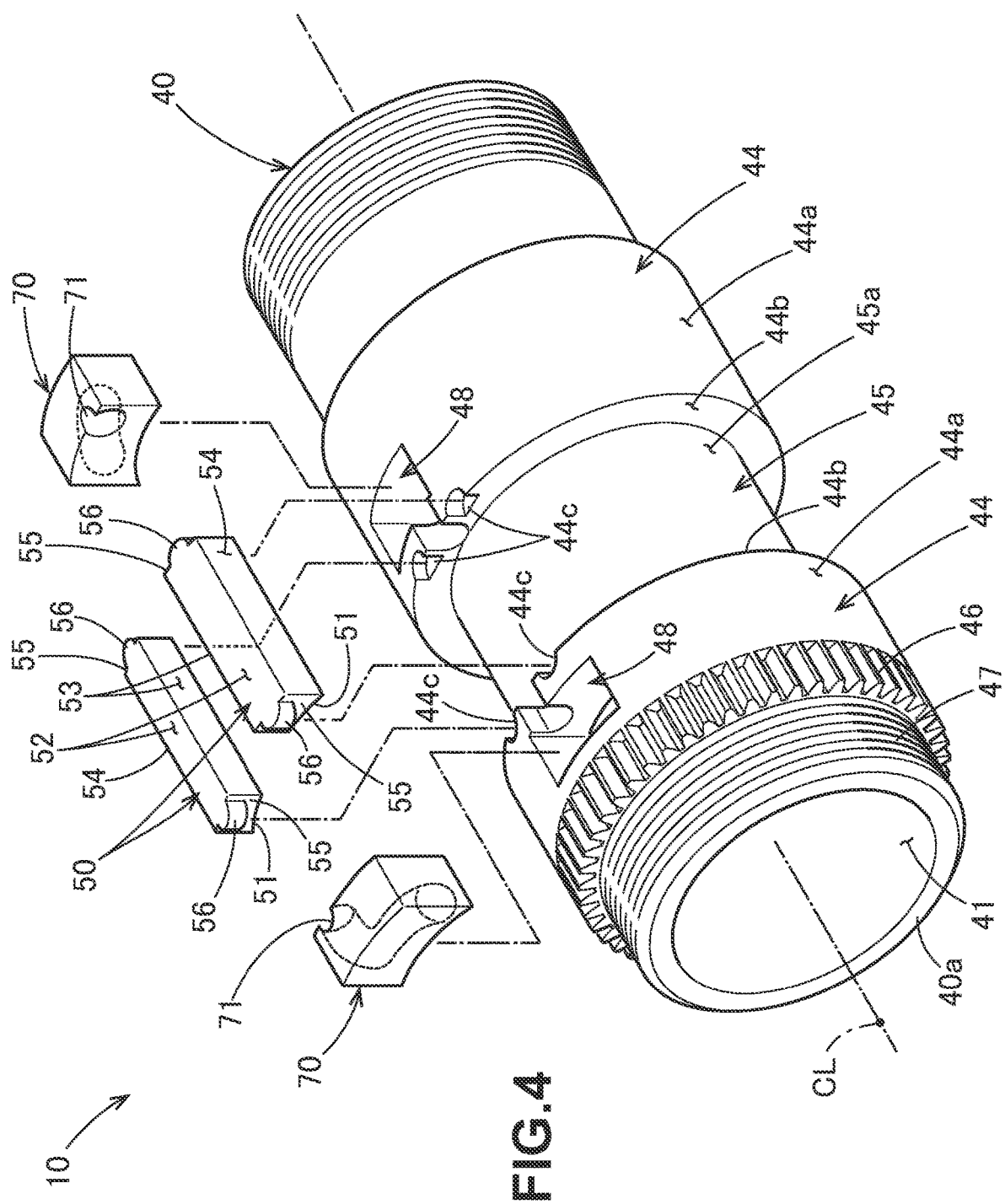
FIG. 4 is an exploded view of the nut, the guide member and the end deflector shown in FIG. 2.

As shown in FIG. 2 to FIG. 4, the nut 40 includes a pair of large-diameter portions 44 and 44 located at opposite ends in the axial direction (along the axial line CL of the nut 40) and a small-diameter portion 45 integrally formed between the two large-diameter portions 44 and 44. The two large-diameter portions 44 and 44 and the small-diameter portion 45 are located concentric with respect to the axial line CL of the nut 40. The outer peripheral surfaces 44a and 44a of the two large-diameter portions 44 and 44, and the outer peripheral surface 45a of the small-diameter portion 45 are surfaces defined by true and concentric circles around the axis CL, respectively. The outer diameters D1 of the two large-diameter portions 44 and 44 are the same. The outer diameter D2 of the small-diameter portion 45 is smaller than the outer diameter D1 of each of the two large-diameter portions 44 and 44. Thus, the small-diameter portion 45 has a thinner wall thickness than the large-diameter portion by the amount that corresponds to the difference between the smaller diameter of the small-diameter portion and the larger diameter of the large-diameter portions 44. As a result, the nut 40 has a reduced weight.

As shown in FIG. 4, it is preferable that each of the two guiding members 50 and 50 be a resin-molded product and be detachable in the radial direction from the outer peripheral surface 45a of the small-diameter portion 45. The two guide members 50 and 50 can be manufactured from resin independently from the nut 40, and can be reduced in weight. As a result, the ball screw device 10 can be further reduced in weight.

The two guide members 50 and 50 are positioned with a certain distance Le (see FIG. 3) from the small-diameter portion 45 in the outer circumferential direction of the small-diameter portion 45, and extend between the opposite (facing each other) end faces 44b and 44b of the two large-diameter portions 44 and 44, i.e., the two guide members extend from one end face 44b to the mating end face 44b.

Furthermore, as shown in FIG. 3 and FIG. 4, each of the two guide members 50 and 50 has a bar-shaped configuration whose cross-sectional shape is rectangular, when viewed from the direction along the axial line CL of the nut 40. More particularly, when the two guide members 50 and 50 are situated away from the small-diameter portion with the spacing Le in the outer peripheral direction of the small-diameter portion 45, the breakdown of the four surfaces 51 to 54 of the rectangular cross-sectional shape of each of the guide members 50 and 50 is as follows: first surfaces 51 and 51 capable of contacting over the entire surface of the outer peripheral surface 45a of the small-diameter portion 45, second surfaces 52 and 52 capable of contacting over the entire surface to the inner peripheral surface 61a of the fitting portion 61, third surfaces 53 and 53 facing each other with the spacing Le, and fourth surfaces 54 and 54 opposite to the third surfaces 53 and 53, respectively. Each of the first surfaces 51 and 51 is constituted by the same curved surface as the outer peripheral surface 45a of the small-diameter portion 45. Each of the second surfaces 52 and 52 is constituted by the same curved surface as the inner peripheral surface 61a of the fitting portion 61. The third surfaces 53 and 53 and the fourth surfaces 54 and 54 are parallel to each other.

As shown in FIG. 3, the depth from the outer peripheral surface 44a of the large-diameter portion 44 to the outer peripheral surface 45a of the small-diameter portion 45, i.e., the depth of the small-diameter portion 45 with respect to the large-diameter portion 44, is Dp. In the configuration in which the guide member 50 is fitted over the outer peripheral surface 45a of the small-diameter portion 45, the first surface 51 has no height difference (step) relative to the outer peripheral surface 44a of the large-diameter portion 44 such that the first surface 51 is smoothly continuous to (flush to) the outer peripheral surface 44a of the large-diameter portion 44. The spacing Le between the two guide members 50 and 50 and the depth of the small-diameter portion 45 relative to the large-diameter portion 44 Dp are set to the sizes that allow the balls 30 shown in FIG. 1 to roll (e.g., slightly larger than the diameter of each ball 30).

As shown in FIG. 4, each of the two guide members 50 and 50 has a pair of first positioning portions 56 and 56 at opposite ends 55 and 55 (end faces 55 and 55) thereof in the axial direction of the nut 40. Each of the first positioning portions 56 has a configuration of an arcuate projection when viewed from the first surface 51.

On the other hand, a plurality of (e.g., four) second positioning portions 44c are formed on the outer peripheral surfaces 44a and 44a of the two large-diameter portions 44 and 44. Each of the second positioning portions 44c has a configuration of a recess that can receive the associated first positioning portion 56 from the outside in the radial direction of the large-diameter portion 44, 44, and is concave from the outer peripheral surface 44a of each of the two large-diameter portions 44 and 44. The shape of the second positioning portion 44c is an arc shape which is the same as the first positioning portion 56, 56, when viewed from the outside in the radial direction of the large-diameter portion 44, 44.

As the first positioning portions 56 fit in the respective second positioning portions 44c, the two guide members 50 and 50 are positioned in the nut 40.

Figure 5:
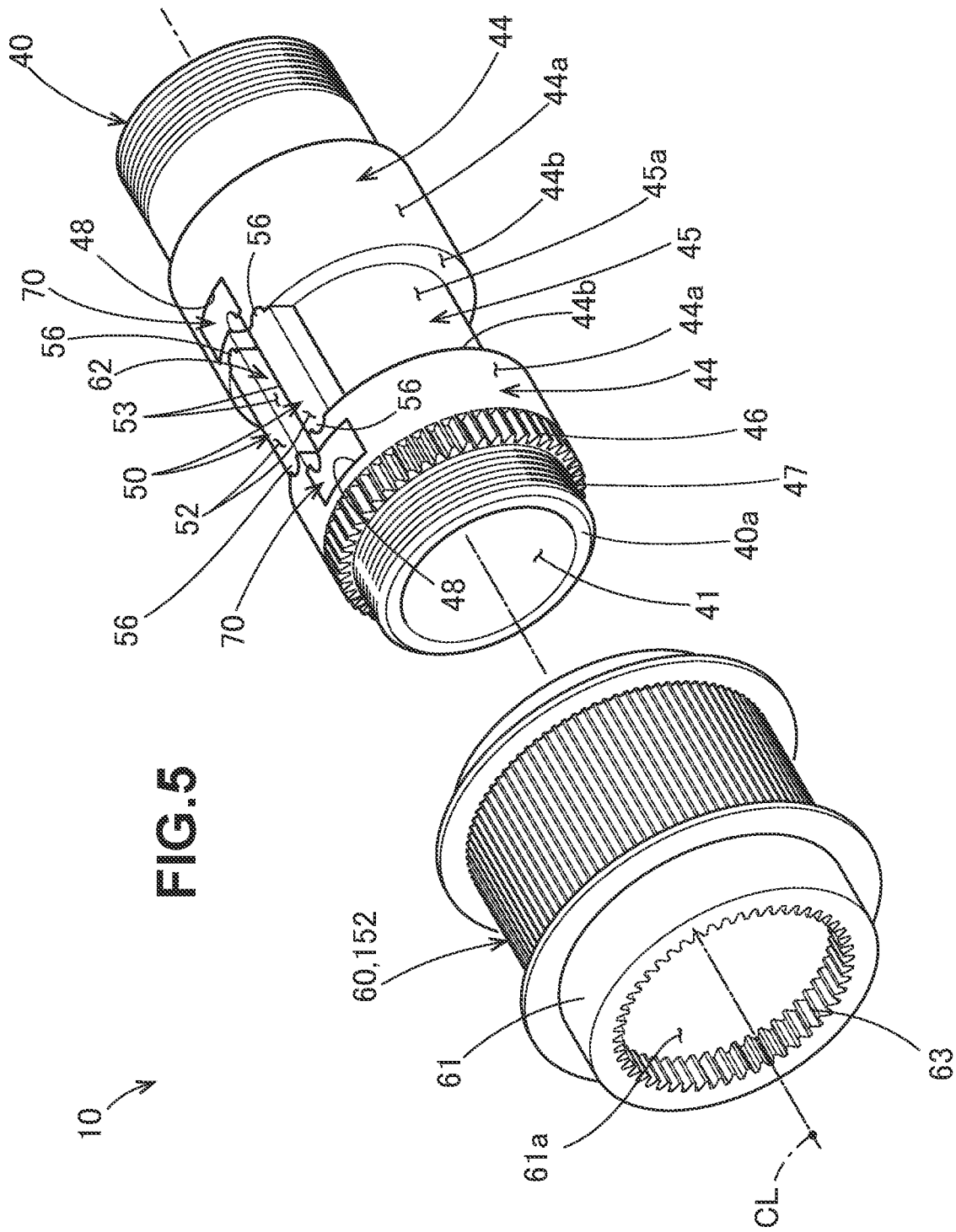
FIG. 5 is an exploded view of a transmission member and a subassembly in which the nut, the guide member and the end deflector shown in FIG. 2 are assembled.

As shown in FIG. 2, FIG. 3 and FIG. 5, the transmission member 60 is capable of transmitting the rotational force to the nut 40 and receiving the rotational force from the nut 40, and may include various rotating elements such as pulleys, gears, sprockets, shaft couplings and rotating shafts.

The transmission member 60 has a cylindrical fitting portion 61 which can fit over the two large-diameter portions 44 and 44. The fitting portion 61 corresponds to a hub at the center portion of the transmission member 60, and has an inner peripheral surface 61a that can fit over the outer peripheral surfaces 44a and 44a of the two large-diameter portions 44 and 44.

As shown in FIG. 2 and FIG. 3, when the fitting portion 61 fits over the two large-diameter portions 44 and 44, the fitting portion 61 covers the two large-diameter portions 44 and 44 while restricting the displacements of the two guide members 50 and 50 in the radially outward direction. Thus, the transmission member 60 serves as a cover with respect to the nut 40 such that the transmission member covers the two guide members 50 and 50 while regulating the displacements of the two guide members 50 and 50 in the radially outward direction.

The space 62 surrounded by the small-diameter portion 45 of the nut 40 and the two guide members 50 and the fitting portion 61 which are assembled to the nut 40 is hereinafter referred to as a "circulation passage 62". That is, the small-diameter portion 45, the two guide members 50, and the fitting portion 61 define, in combination, the hollow circulation passage 62. As shown in FIG. 1, the balls 30 rolling through the thread groove 43 can circulate through the circulation passage 62.

As shown in FIG. 2, the transmission member 60 is coupled to the nut 40 such that the rotational forces can be transmitted between the transmission member and the nut. For example, the transmission member 60 may be coupled to the nut 40 by serrations, splines, keys, bolts or pins while regulating the rotations relative to each other.

In one example, a male serration 46 and the male thread 47 are formed, in this order, on the nut 40 between one of the large-diameter portions 44 and one end face 40a of the nut 40. The male serration 46 has a diameter smaller than the diameter of the large-diameter portion 44. That is, a height difference or step (first step) is formed between the large-diameter portion 44 and the male serration 46. The male thread 47 has a diameter smaller than the diameter of the male serration 46. On the other hand, a female serration 63 connectable to the male serration 46 is provided on the inner peripheral surface 61a of the fitting portion 61. The female serration 63 has a diameter smaller than the diameter of the inner peripheral surface 61a of the fitting portion 61. That is, a step (second step) is formed between the inner peripheral surface 61a of the fitting portion 61 and the female serration 63.

As the fitting portion 61 fits from the end face 40a of the nut 40, the combination of the first step and the second step decides the axial position of the fitting portion 61 with respect to the nut 40, and the serration coupling connects the fitting portion to the nut 40 while restricting the rotations relative to each other. The axial position of the fitting portion 61 relative to the nut 40 is locked as the positioning nut 64 is screwed on the male thread 47.

As shown in FIG. 1 and FIG. 2, the two end deflectors 70 and 70 are members that allow the thread groove 43 to communicate with the opposite ends of the circulation passage 62, and are, for example, resin-molded products. Each of the end deflectors 70, 70 has a communication hole 71, 71 which communicates between the thread groove 43 and the circulation passage 62. The balls 30 that roll through the thread groove 43 can move through the communication holes 71 and 71 and circulate in the circulation passage 62.

As shown in FIG. 4, the two large-diameter portions 44 and 44 have a pair of concave portions or recesses 48 and 48 in their outer peripheral surfaces 44a and 44a, respectively. The two recesses 48, 48 are made from the outer peripheral surfaces 44a and 44a of the two large-diameter portions 44 and 44, respectively. The two end deflectors 70 and 70 can be individually fitted into the recesses 48 and 48 from the outside in the radial directions of the large-diameter portions 44 and 44.

As shown in FIG. 2 and FIG. 5, when the two end deflectors 70 and 70 are fitted into the recesses 48 and 48, respectively, the outer surface of each of the end deflectors 70 and 70 forms no step relative to the outer peripheral surface 44a of the large-diameter portion 44 and is very smoothly continuous (flush) to the outer peripheral surface 44a of the large-diameter portion 44. The fitting portion 61 of the transmission member 60 and the two guide members 50 and 50 cover the two end deflectors 70 and 70 while regulating the displacements of the two end deflectors 70 and 70 in the radially outward direction.

As is apparent from the foregoing description, the transmission member 60 has all the following four configurations.

First, the transmission member 60 is configured to transmit the rotational force to the nut 40 and receive the rotational force from the nut 40 (see FIG. 2).

Second, the transmission member 60 is configured to cover the nut 40 while restricting the displacements of the two guide members 50 and 50 in the radially outward direction (see FIG. 3).

Third, the transmission member 60 is configured to define the circulation passage 62 in cooperation with the small-diameter portion 45 and the two guiding members 50 and 50 (see FIG. 3).

Fourth, the transmission member 60 is configured to cover the nut 40 in cooperation with the two guide members 50 and 50 while regulating the displacements of the end deflectors 70 and 70 in the radially outward direction (see FIG. 2 and FIG. 3).

Next, referring to FIG. 6, an exemplary vehicle steering apparatus 100 using the above-described ball screw device 10 will be described.

The steering apparatus 100 for the vehicle is constituted by a steering system 110 and a steering power transmission mechanism 130, or only the steering power transmission mechanism 130. The steering system 110 is a system extending from a steering wheel 111 of the vehicle to wheels (tires) 121 and 121 (turning wheels or leading wheels 121 and 121). The steering power transmission mechanism 130 is configured to add the steering power to the wheels 121 and 121.

This embodiment will describe the steering power transmission mechanism 130 by using an example of an auxiliary torque mechanism that adds an auxiliary torque to the steering system 110. in the following description, the steering power transmission mechanism 130 is occasionally referred to as an "auxiliary torque mechanism 130."

The steering system 110 includes the steering wheel 111, a steering shaft 112 connected to the steering wheel 111, an input shaft 114 connected to the steering shaft 112 by a universal shaft coupling 113, a wheel-turning axle 116 connected to the input shaft 114 by a first transmission mechanism 115, and the left and right (opposite sides in the vehicle width direction) wheels 121,121 connected to opposite ends of the wheel-turning axle 116 via ball joints 117,117, tie rods 118,118, and knuckles 119,119. The first transmission mechanism 115 is, for example, a rack and pinion mechanism.

When the steering system 110 is used, a driver operates (turns) the steering wheel 111 to apply the steering torque such that the left and right wheels 121 and 121 are steered through the first transmission mechanism 115, the wheel-turning axle 116, and the left and right tie rods 118 and 118.

The auxiliary torque mechanism 130 (the steering power transmission mechanism 130) includes a steering torque sensor 131, a control unit 132, an electric motor 133, and a second transmission mechanism 134. The steering torque sensor 131 detects the steering torque of the steering system 110 applied to the steering wheel 111. The control unit 132 generates a control signal based on a torque detection signal of the steering torque sensor 131. The electric motor 133 generates a motor torque (auxiliary torque) corresponding to the steering torque, i.e., a driving force for steering, based on the control signal of the control unit 132. The second transmission mechanism 134 transmits the auxiliary torque, which is generated by the electric motor 133, to the wheel-turning axle 116.

When the vehicle steering apparatus 100 is used, the wheels 121 and 121 can be steered by the wheel-turning axle 116 with a composite torque obtained by adding the auxiliary torque of the electric motor 133 to the steering torque of the driver.

The wheel-turning axle 116 is constituted by the above-described screw shaft 20 and is housed in a housing 140 such that the wheel-turning axle 116 can move in the vehicle width direction (axial direction). The first transmission mechanism 115 and the second transmission mechanism 134 are also housed in the housing 140.

Figure 6:
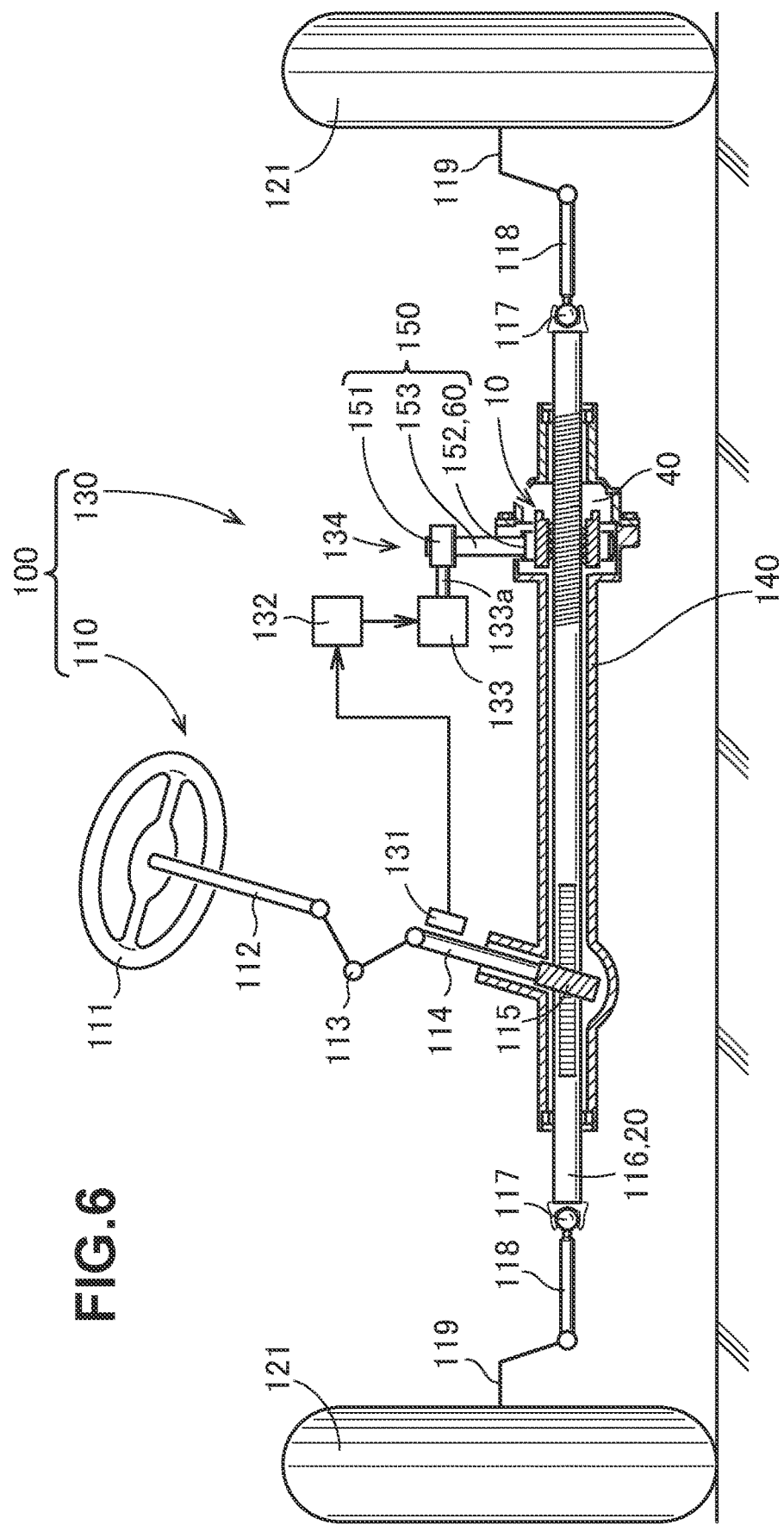
FIG. 6 is a schematic view of a vehicle steering apparatus using the ball screw device shown in FIG. 1.

As shown in FIG. 1 and FIG. 6, the second transmission mechanism 134 includes, for example, a belt transmission mechanism 150 and the above-described ball screw device 10.

The belt transmission mechanism 150 includes a drive pulley 151 disposed on an output shaft 133a of the electric motor 133, a driven pulley 152 provided on the nut 40 of the ball screw device 10, and a belt 153 hung on the drive pulley 151 and the driven pulley 152. The driven pulley 152 is one example of the transmission member 60 of the ball screw device 10. Hereinafter, the driven pulley 152 will be occasionally referred to as the "transmission member 60."

The nut 40 of the bail screw device 10 is supported by a bearing 155 such that the nut can rotate relative to the housing 140 and the movement of the nut is restricted in the axial direction. The ball screw device 10 transmits a driving force for steering, which is generated by the electric motor 133 (see FIG. 6), i.e., the auxiliary torque, to the wheel-turning axle 116.

The foregoing description is summarized as follows.

As shown in FIG. 1 to FIG. 5, the ball screw device 10 includes:

a screw shaft 20 having the threaded portion 22 on the outer peripheral surface 21;

a plurality of balls 30 situated on the threaded portion 22 such that the balls 30 can roll on the threaded portion 22;

the nut 40 having a cylindrical configuration which is connected to the threaded portion 22 by the balls 30, the nut 40 having a pair of large-diameter portions 44 and 44 located at the opposite ends in the axial direction, and the small-diameter portion 45 formed integrally between the two large-diameter portions 44 and 44, the small-diameter portion 45 having a smaller diameter than each of the two large-diameter portions 44 and 44;

a pair of guide members 50 and 50 which are detachable from the outer peripheral surface 45a of the small-diameter portion 45 in the radial direction, are situated with a certain gap Le from the small-diameter portion 45 in the outer peripheral direction of the small-diameter portion 45, and extend between the two confronting end faces 44b and 44b of the two large-diameter portions 44 and 44; and the transmission member 60 having the fitting portion 61 that can fit over the two large-diameter portions 44 and 44 such that the fitting portion 16 fitting over the two large-diameter portions 44 and 44 covers the two guide members 50 and 50 while regulating the displacement of the two guide members in the radially outward direction, and cooperates with the small-diameter portion 45 and the two guide members 50 and 50 to define the circulation passage 62 for the balls 30, the transmission member 60 being connected to the nut 40 such that the rotational force can be transmitted from the transmission member to the nut and vice versa.

In the present invention, therefore, the weight reduction is achieved as the cylindrical nut 40 uses the small-diameter portion 45 to couple the two large-diameter portions 44 and 44 to each other located at the opposite ends in the axial direction.

In addition, in the present invention, the transmission member 60 assembled to the nut 40 is effectively utilized. The fitting portion 61 of the transmission member 60 covers the two guide members 50 and 50 while regulating the displacement of the two guide members relative to the nut 40 in the radially outward direction. Therefore, the two guide members 50 and 50 do not disengage from the nut 40.

Accordingly, it is not necessary to use a separate member for regulating the displacement of each of the guide members 50 and 50 relative to the nut 40 in the radially outward direction. Moreover, between the large-diameter portions 44 and 44 of the nut 40 and the transmission member 60, there is no separate inclusions at all. Therefore, the size of the outer diameter D1 of each of the large-diameter portions 44 and 44 is hardly limited by the size of the transmission member 60. Thus, it is possible to increase the degree of freedom in design of the ball screw device 10.

Further, the circulation passage 62 is defined by the fitting portion 61, the small-diameter portion 45, and the two guide members 50 and 50. The depth Dp of the small-diameter portion 45 with respect to the large-diameter portion 44 (see FIG. 3) is only required to be equal to or greater than the diameter of the ball 30. The balls 30 rolling on the threaded portion 22 can circulate through the circulation passage 62. Therefore, the degree of freedom in the design of the ball screw device 10 can be further increased.

As is apparent from the foregoing description, the embodiment of the present invention can reduce the weight of the ball screw device 10 while increasing the degree of freedom in the design of the ball screw device 10.

Furthermore as shown in FIG. 4, each of the two guide members 50 and 50 has a pair of first positioning portions 56 and 56 at the opposite ends 55 and 55 in the axial direction of the nut 40, and the two large-diameter portions 44 and 44 have a plurality of second positioning portions 44*c* on the outer peripheral surfaces 44*a* and 44*a* such that the two first positioning portion 56 and 56 can be fitted in the second positioning portions 44*c* from the outside in the radial direction.

Therefore, upon simply fitting the first positioning portions 56 in the second positioning portions 44*c* from the outside in the radial direction, it is possible to accurately and easily position the two guide members 50 and 50 to the nut 40. Moreover, it is possible to reliably hold the positions of the two guide members 50 and 50 relative to the nut 40.

As shown in FIG. 3, the two guiding members 50 and 50 include, respectively:

the first surfaces 51 and 51 which are configured to have the same curved surface as the outer peripheral surface 45*a* of the small-diameter portion 45 and which can be in contact with the outer peripheral surface 45*a* of the small-diameter portion 45; and the second surfaces 52 and 52 which are configured to have the same curved surface as the inner peripheral surface 61*a* of the fitting portion 61 and which can be in contact with the inner peripheral surface 61*a* of the fitting portion 61.

Therefore, it is possible to hold the two guide members 50 and 50 to the nut 40 and the transmission member 60 in a stable manner when the two guide members 50 and 50 are assembled to the nut 40 and covered with the fitting portion 61.

Further, as shown in FIG. 1 to FIG. 5, the two large-diameter portions 44 and 44 have a pair of recesses 48 and 48 on the outer peripheral surfaces 44*a* and 44*a*, the device further includes the two end deflectors 70 and 70 that can be individually fitted into the two recesses 48 and 48 from the radially outward direction, the two end deflectors 70 and 70 communicate the threaded groove 43 of the portion where the screw shaft 20 faces the nut 40, with the opposite ends of the circulation passage and the fitting portion 61 covers the two end deflectors 70 and 70 while regulating the displacement of the two end deflectors in the radially outward direction.

Therefore, it is possible to individually fit (engage) the two end deflectors 70 and 70 into the recesses 48 and 48 formed in the outer peripheral surface 44*a* and 44*a* of the two large-diameter portions 44 and 44 from the outside in the radial direction. Moreover, it is possible to effectively utilize the transmission member 60 together with the two guide members 50 and 50 when covering the two end deflectors 70 and 70. Thus, there is no need for "a separate member or members" to cover the two end deflectors 70 and 70. Further, since the two guide members 50 are 50 are separate from the two end deflectors 70 and 70, each of the two guide members can have a simple shape.

As shown in FIG. 1, the vehicular steering system 100 includes:

the above-described ball screw device 10;

the electric motor 133 for generating a steering driving force transmitted from the transmission member 60 to the nut 40; and the wheel-turning axle 116 that includes the screw shaft 20 and causes the wheels 121 and 121 to turn.

Therefore, as the steering driving force generated by the electric motor 133 is transmitted from the transmission member 60 to the nut 40, the rotational motion of the nut 40 is converted into the linear motion of the wheel-turning axle 116 such that the wheels 121 and 121 are turned efficiently.

Second Embodiment

Figure 7:
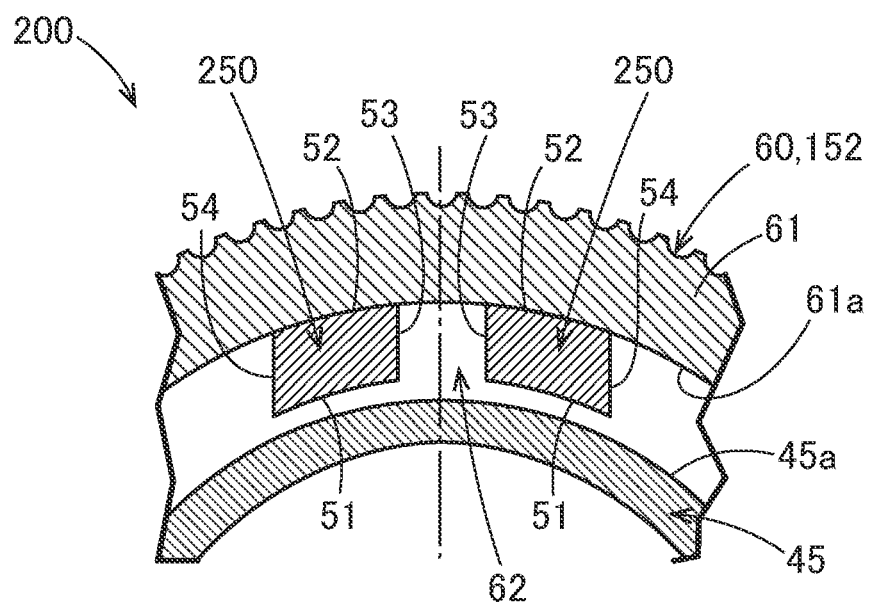
FIG. 7 is a cross-sectional view around the guide member of the ball screw device according to a second embodiment of the present invention.

Referring to FIG. 7, a ball screw device 200 of a second embodiment will be described. FIG. 7 is depicted to correspond to FIG. 3. The ball screw device 200 of the second embodiment is characterized in that a pair of guide members 50 and 50 of the ball screw device 10 of the first embodiment shown in FIG. 1 to FIG. 6 are changed to a pair of guide members 250 and 250 shown in FIG. 7. Other configurations of the second embodiment are the same as those of the first embodiment, and therefore descriptions thereof are omitted.

The first surfaces 51 and 51 of the two guiding members 250 and 250 of the second embodiment are spaced from the outer peripheral surface 45*a* of the small-diameter portion 45 without contacting the outer peripheral surface 45*a* of the small-diameter portion 45. That is, there is a clearance between the first surfaces 51 and 51 and the outer peripheral surface 45*a*. Therefore, it is not necessary to strictly control the dimensions from the first surfaces 51, 51 to the second surfaces 52, 52. It is possible to reduce the management man-hours required by the ball screw device 200. Other functions and effects/advantages of the second embodiment are the same as those of the first embodiment.

Third Embodiment

Figure 8:
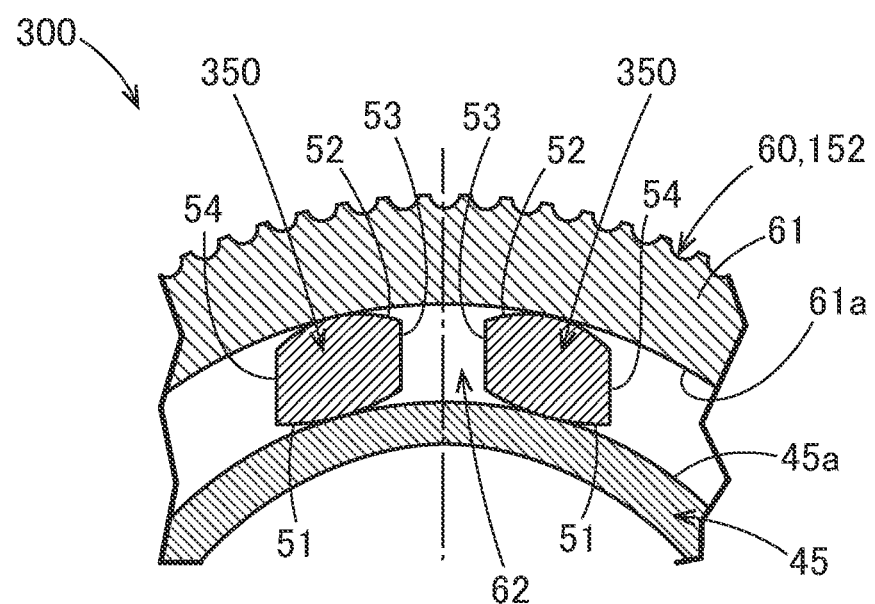
FIG. 8 is a cross-sectional view around the guide member of the ball screw device according to a third embodiment of the present invention.

Referring to FIG. 8, a ball screw device 300 of a third embodiment will be described. FIG. 8 is depicted to correspond to FIG. 3. The ball screw device 300 of the third embodiment is characterized in that a pair of guide members 50 and 50 of the ball screw device 10 of the first embodiment shown in FIG. 1 to FIG. 6 are changed to a pair of guide members 350 and 350 shown in FIG. 8. Other configurations of the third embodiment are the same as those of the first embodiment, and therefore descriptions thereof are omitted.

The first surfaces 51 and 51 and the second surfaces 52 and 52 of the two guiding members 350 and 350 of the third embodiment are curved surfaces that are convex outward, respectively. Specifically, each of the first surfaces 51 and 51 is configured to have a curved cross-section which is convex toward the outer peripheral surface 45a of the small-diameter portion 45. Therefore, in the third embodiment, only the peak of the convex curve of each of the first surfaces 51 and 51 can contact the outer peripheral surface 45a of the small-diameter portion 45. Each of the second surfaces 52 and 52 is configured to have a curved cross-section which is convex toward the inner peripheral surface 61a of the fitting portion 61. Therefore, the third embodiment, only the peak of the convex curve of each of the second surfaces 52 and 52 can contact the inner peripheral surface 61a of the fitting portion 61. Therefore, it is not necessary to strictly control the shapes and dimensions of the first surfaces 51 and 51 and the second surfaces 52 and 52. It is possible to reduce the management man-hours required by the ball screw device 300. Othe functions and effects/advantages of the third embodiment are the same as those of the first embodiment.

Fourth Embodiment

Referring to FIG. 9 to FIG. 16, a ball screw device 400 of a fourth embodiment will be described. The ball screw device 400 of the fourth embodiment is characterized in that a pair of two end deflectors 70 and 70 of the ball screw device 10 of the above-described first embodiment shown in FIG. 1 to FIG. 6 are changed to a pair of end deflectors 470 and 470 shown in FIG. 9 to FIG. 16. Other configurations of the fourth embodiment are the same as those of the first embodiment, and therefore descriptions thereof are omitted.

The ball screw device 400 will be described in detail below.

As shown in FIG. 1 and FIG. 9 to FIG. 11, the ball screw device 400 is configured to include a nut 40 in which a spiral groove 42 (threaded portion 42) is formed on the inner peripheral surface 41, a screw shaft 20 over which a nut 40 engages and which has a spiral groove 22 (threaded portion 22) formed on the outer peripheral surface 21, a plurality of balls 30 rolling along the spiral groove 22, and the two end deflectors 470 and 470 (only one of which is shown) attached to the nut 40. In the following description, the traveling direction of the balls 30 refers to a direction in which the balls 30 enter the end deflector 470 from the spiral grooves 22 and 42.

"Nut 40"

Figure 9:
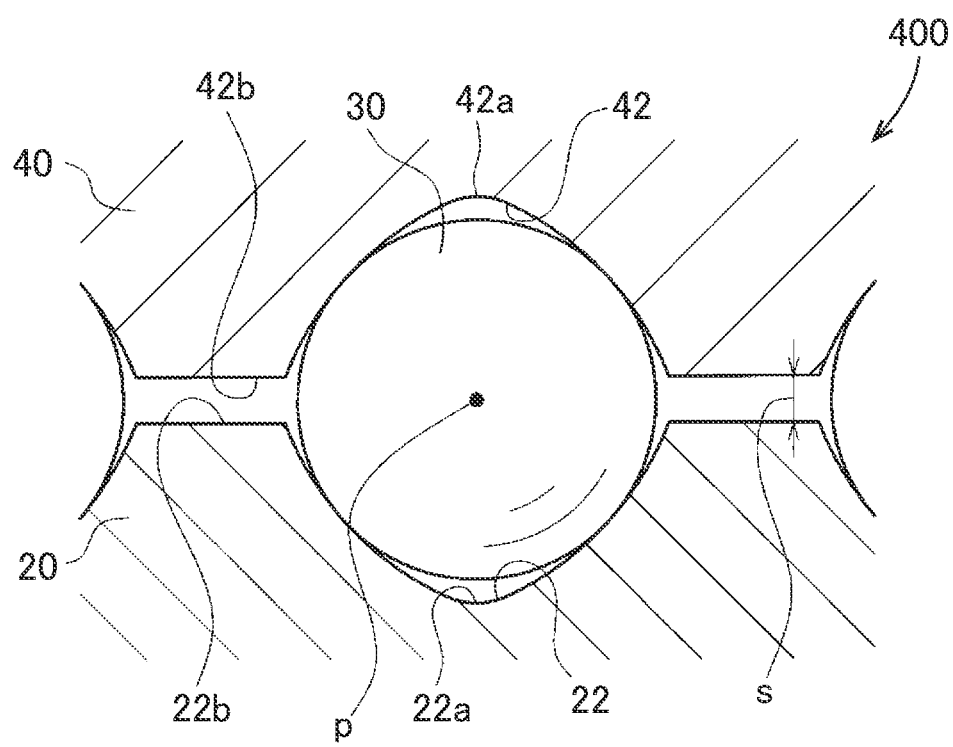
FIG. 9 is a cross-sectional view showing a threaded portion of a nut and a threaded portion of a screw shaft of the ball screw device according to a fourth embodiment of the present invention.
Figure 10:
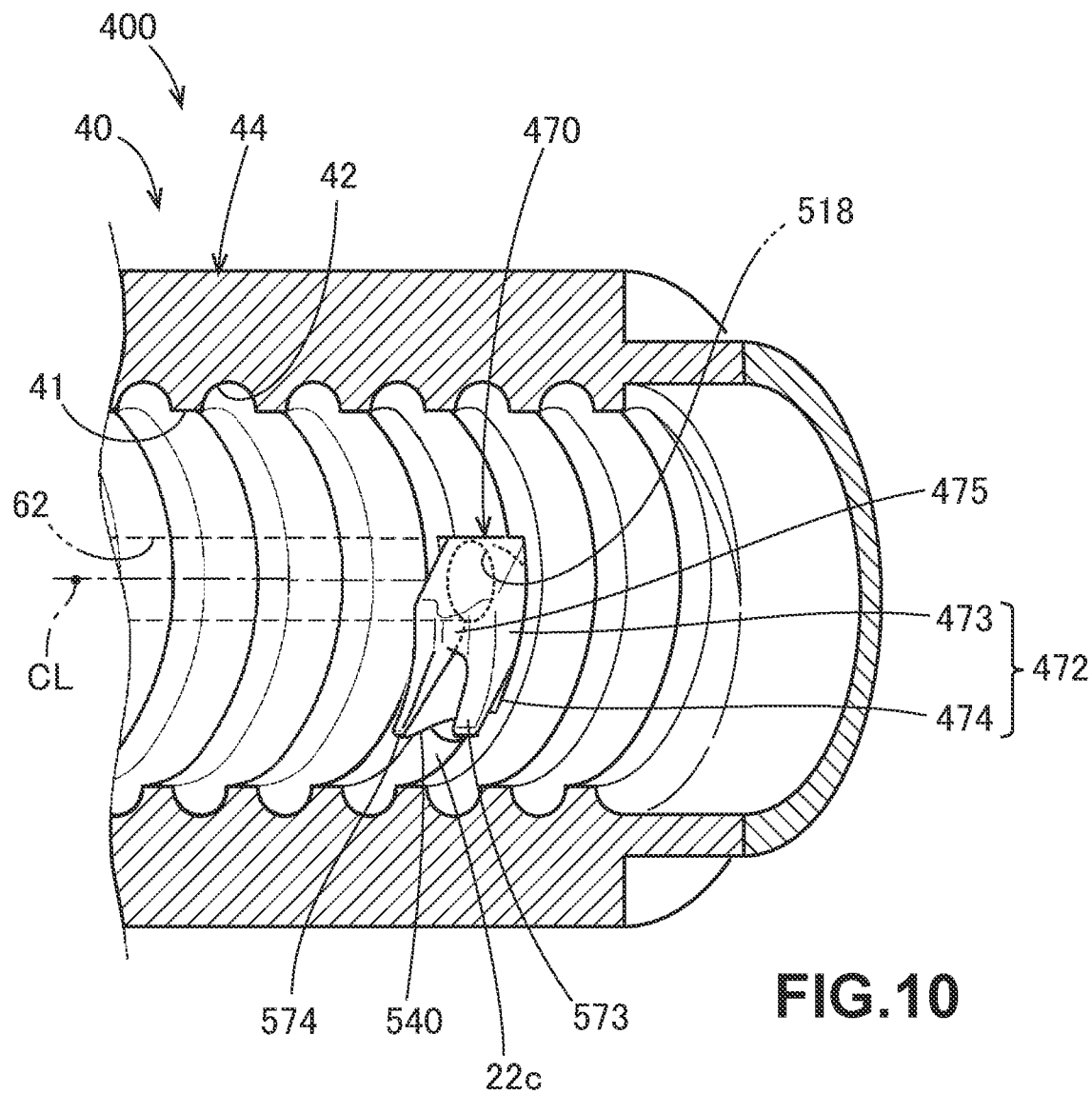
FIG. 10 is a view of an appearance of the ball screw device according to the fourth embodiment of the present invention and shows a state in which the end deflector is assembled to the nut (screw shaft is not shown).

Nut 40 is a cylindrical member. As shown in FIG. 9, the nut 40 has the spiral groove 42 for receiving the ball 30 between the spiral groove 22 of the screw shaft 20 and the spiral groove 42. The cross-sectional shape of each of the spiral grooves 22 and 42 is, for example, a Gothic arc shape having a groove bottom 22a, 42a with a relatively sharp point. A top flat portion 22b between each two adjacent threads of the spiral groove 22 is spaced from the mating top flat portion 42b of the spiral groove 42 by a gap s.

FIG. 11(a) shows the condition prior to assembling the end deflector 470 to the nut 40. FIG. 11(b) illustrates a configuration in which the end deflector 470 shown in FIG. 11(a) is viewed from the outside in the radial direction.

As shown in FIG. 11(a) and FIG. 11(b), the outside Ot in the axial line CL direction (axis CL direction) or the axial line CL direction outside Ot refers to a direction away along the axial line CL direction from the center of the nut 40 in the axial line CL direction, and the inside In in the axial line CL direction or the axial line CL direction inside In refers to a direction approaching the center of the nut 40 in the axial line CL direction.

The receiving portion 48 (i.e., the recess 48) for receiving the end deflector 470 is defined by a first side wall surface 628 extending from the inner peripheral surface 41 of the nut 40 toward the outer peripheral surface 44a, a second side wall surface 629 also extending from the inner peripheral surface 41 of the nut 40 toward the outer peripheral surface 44a and facing the first side wall surface, a bottom wall surface 630 (i.e., corresponding to the inner peripheral surface 61a of the fitting portion 61) formed between the edge of the first side wall surface 628 adjacent to the outer peripheral surface 44a of the nut 40 and the edge of the second side wall surface 629 adjacent to the outer peripheral surface 44a of the nut 40, a first abutment surface 631 formed between the axial line CL direction inside edge of the first side wall surface 628, the axial line CL direction inside edge of the second side wall surface 629, and the axial line CL direction inside edge of the bottom wall surface 630, and a second abutment surface 632 formed between the axial line CL direction outside edge of the first side wall surface 628, the axial line CL direction outside edge of the second side wall surface 629, and the axial line CL direction outside edge of the bottom wall surface 630.

The first side wall surface 628, the second side wall surface 629 and the bottom wall surface 630 extend along the axial line CL direction, and the first abutment surface 631 extends along a plane perpendicular to the axial line CL direction. Although the first side wall surface 628 and the second side wall surface 629 face each other, the two side wall surfaces 628 and 629 need not be parallel to each other. The second side wall surface 629 is formed such that the side wall surface 629 smoothly connects to the end portion 22c of the spiral groove 22. An opening of the circulation path 62 (circulation passage 62) faces the first abutment surface 631. The circulation passage 62 is formed in the nut 40 along the axial line CL direction, and a similar opening is formed at the opposite end of the nut 40.

"End Deflector 470"

Referring also to FIG. 9, the end deflector 470 is a member that has a function of regulating the spiral movement of the balls 30 in the spiral grooves 22 and 42 and the movement of the balls in the axial line CL direction in the circulation passage 62, i.e., the function of changing the orientation of the balls 30 between the spiral grooves 22, 42 and the circulation passage 62.

Figure 12A:
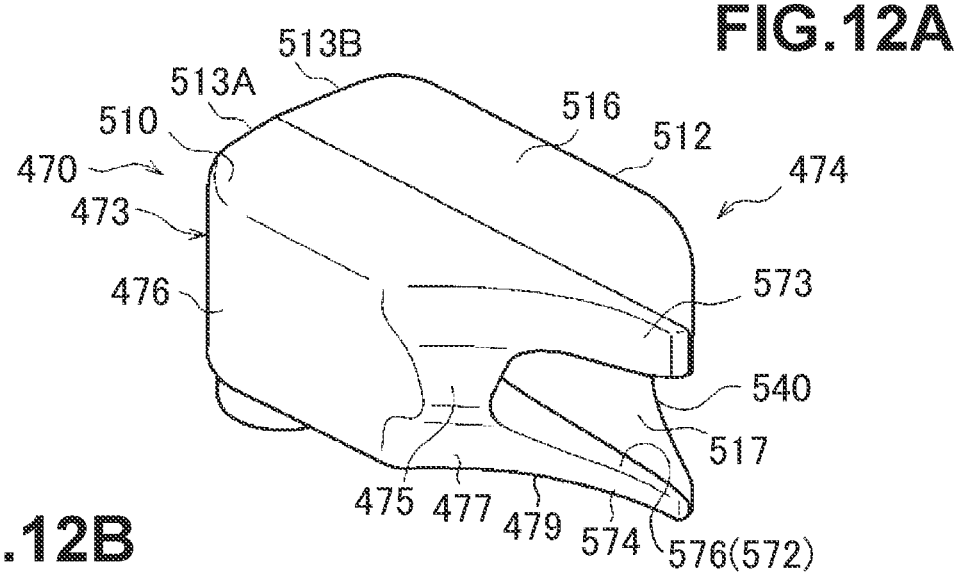
FIG. 12 is a set of views showing a configuration of the end deflector of the ball screw device according to the fourth embodiment of the present invention.
Figure 12B:
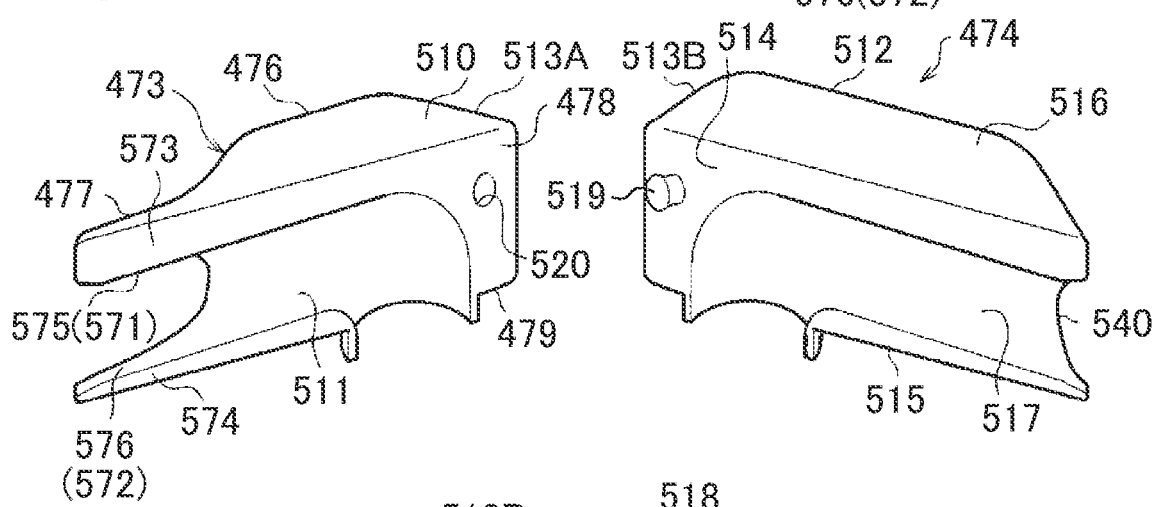
Figure 12C:
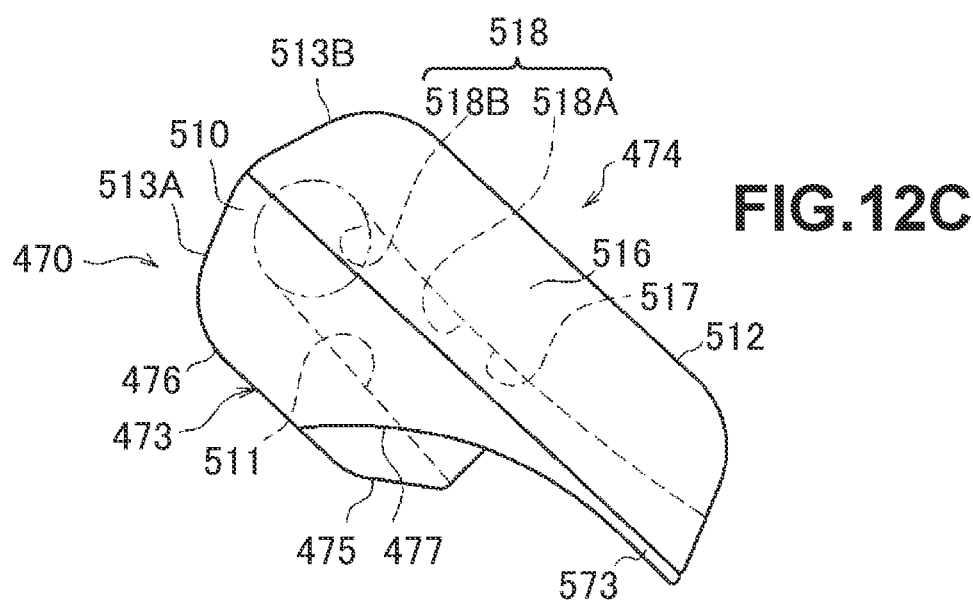

FIG. 12(a) is a perspective view of a state in which the first member 473 and the second member 474 of the end deflector 470 are assembled, FIG. 12(b) is a perspective view of a state prior to assembling the first member 473 and the second member 474, and FIG. 12(c) is a plan view of the state in which the first member 473 and the second member 474 are assembled.

Referring primarily to FIG. 11 and FIG. 12, a passage 518 (communication hole 518) for passing the balls 30 is formed inside the end deflector 470. In the fourth embodiment, mainly from the viewpoint of easily making the passage 518, the end deflector 470 is divided into the first member 473 which has a passage therein such that the passage has a semicircular cross-sectional shape (referred to as a first half passage 511) and is connected to the spiral groove 22 of the screw shaft 20, and the second member 474 which has a passage therein such that the passage has a semicircular cross-sectional shape (referred to as a second half passage 517) and is connected to the spiral groove 22 of the nut 40. The material of the end deflector 470 is not particularly limited, and the material may be a metal material, a synthetic resin material, or the like. When the end deflector 470 is made of, for example, a zinc material, the parts can be formed by a die casting method.

The first member 473 includes a first side surface 476 that has a shape conforming to the first side wall surface 628, as an outer surface generally extending along the axial line CL direction, an outer surface 513A that has a shape conforming to the bottom wall surface 630, an inner surface 477 facing the screw shaft 20, and a division surface 478 that is a surface in contact with the second member 474. An end face of the first member 473 proximal to the axial line CL direction is formed as a surface 479 abutting against the first abutting surface 631. An end surface of the first member 473 distal from the axial line CL direction is formed as a surface 510 abutting against the second abutting surface 632. On the division surface 478, formed is the first half passage 511 which constitutes a half of the passage 518 for the balls 30. A claw portion 475 is formed on a portion of the inner surface 477 such that the claw portion 475 bulges in the radially inward direction relative to the axial line CL and is situated in the spiral groove 22 of the screw shaft 20. The claw portion 475 has a substantially semicircular shape such that the size of the claw portion 475 does not interfere with the spiral groove 22.

The second member 474 includes the second side surface 512 that has a shape conforming to the second side wall surface 629, as an outer surface generally extending along the axial line CL direction, the outer surface 513B that has a shape conforming to the bottom wall surface 630, and a division surface 514 that is a surface in contact with the first member 473. An end face of the second member 474 proximal to the axial CL direction is formed as a surface 515 abutting against the first abutting surface 631. An end face of the second member 474 distal from the axial CL direction is formed as a surface 516 abutting against the second abutting surface 632. The second half passage 517, which constitutes a half of the passage 71 for the balls 30, is formed on the division surface 514. A cut-out portion 540 is formed at the front end of the second half passage 517 such that the balls 30 are guided smoothly from the end 22c of the spiral groove 22.

An engaging projection 519 is formed on the division surface 514 of the second member 474, and an engaging recess 520 is formed on the division surface 478 of the first member 473. The first member 473 and the second member 474 are joined (united) to form the end deflector 470 as the engagement protrusion 519 snap-fits in the engagement recess 520, for example, and the division surfaces 478 and 514 meet each other. The end surfaces 510 and 516 are flush with each other, and the abutting surfaces 479 and 515 are also flush with each other. Inside the end deflector 470, the first half passage 511 and the second half passage 517 are combined to form the passage 518 that includes a first passage 518A communicating with the spiral grooves 22 and 42, and a second passage 518B smoothly changing its direction from the first passage 518A by approximately 90 degrees, extending along the axial line CL direction and communicating with an opening of the circulation passage 62. The structure that joins the first member 473 with the second member 474 is not particularly limited to the engagement between the engagement protrusion 519 and the engagement recess 520. Also, the structure for joining the first member 473 with the second member 474 may not be provided.

In the above-described configuration, when the ball 30 enters the end deflector 470 as shown in FIG. 13, the ball 30 experiences the following states in the below-indicated order:

(1) Clamped between the spiral groove 42 and the spiral groove 22, (2) Clamped between the spiral groove 42 and the second half passage 517 of the second member 474, and (3) Clamped between the first half passage 511 of the first member 473 and the second half passage 517 of the second member 474.

In the course of the transition from the state (1) to the state (2), the cut-out 540 (see FIG. 12) allows the second half passage 517 of the second member 474 to smoothly communicate with the end portion 22c of the spiral groove 22 of the nut 40 without creating a gap or a step relative to the end portion 22c, and therefore it is possible for the balls 30 to move smoothly. However, in the course of the transition from the state (2) to the state (3), since the screw shaft 20 is a movable body that can move relative to the end deflector 470, it is required to set the gap t between the first member 473 of the end deflector 470 and the spiral groove 22 of the screw shaft 20 for avoiding the collision. As described earlier, therefore, due to the presence of the gap t, the balls 30 are likely to collide with the claw portion 475 to generate a collision sound.

"Ball Lifting Portions 571 and 572"

To address this issue, the end deflector 470 of the embodiment of the present invention includes a pair of ball lifting portions 571 and 572 (see FIG. 14 to FIG. 16) provided across the width center of the spiral grooves 22 of the screw shaft 20. The two ball lifting portions 571 and 572 support the ball 30 at two locations spaced in the width direction of the spiral groove 22 across the width center of the spiral groove 22 and lift the ball 30 from the spiral groove 22.

In the fourth embodiment, the ball lifting portions 571 and 572 are formed on the first member 473. In FIG. 12 to FIG. 14, the first member 473 extends along the ball traveling direction between the second member 474 and the groove edge portion (flat portion) 22b of the screw shaft 20, and has a pair of thin plate portions 573 and 574 spaced from each other in the width direction of the spiral groove 22 across the width center of the spiral groove 22 of the screw shaft 20. An inclined surface 575 is formed on the side surface of the thin plate portion 573 facing the thin plate portion 574, and another inclined surface 576 is formed on the side surface of the thin plate portion 574 facing the thin plate portion 573. Each of the inclined surfaces 575 and 576 inclines such that each of the inclined surfaces 575 and 576 approaches toward the width center of the spiral groove 22 as each of the inclined surfaces 575 and 576 goes in the radially inward direction of the screw shaft 20. In addition, as can be seen from FIG. 15(a) to FIG. 15(c) and FIG. 16, each of the inclined surfaces 575 and 576 has a shape such that the distance L between the inclined surfaces 575 and 576 becomes smaller as the ball moves in its travelling direction. The inclined surfaces 575 and 576 constitute the ball lifting portions 571 and 572. As understood from the foregoing description, the ball lifting portions 571 and 572 are situated at outer positions in the radial direction of the axial line CL than the groove edge portion (flat portion) 22b of the spiral groove 22.

FIG. 15(a), FIG. 15(b) and FIG. 15(c) are cross-sectional views showing how the ball 30 is lifted by the ball lifting portions 571 and 572. The cross-sectional views in FIG. 15(*a*) to FIG. 15(*c*) generally show the cross-sectional view taken along the line A-A in FIG. 16, the cross-sectional view taken along the line B-B in FIG. 16, and the cross-sectional view taken along the line C-C in FIG. 16, respectively. Incidentally, in FIG. 15(*a*) to FIG. 15(*c*) and FIG. 16, the inclined surfaces 575 and 576 are depicted by dots for easy understanding of how the shapes of the inclined surfaces change to gradually reduce the distance L between the inclined surfaces 575 and 576.

The inclined surfaces 575 and 576 may have a curved shape to conform to the spherical surface of the ball 30 or may have a planar shape. As shown in FIG. 14, the distance w between the groove edge portion 22*b* of the screw shaft 20 and the thin plate portions 573 and 574 is set smaller than the distance u between the groove edge portion 22*b* of the screw shaft 20 and the ball center p, and therefore the radially inner edge of each of the inclined surfaces 575 and 576 is located radially inward than the ball center p. Therefore, when the ball 30 reaches the inclined surfaces 575 and 576, the inclined surfaces 575 and 576 contact the spherical surface of the ball below the center p of the ball 30 such that the inclined surfaces 575 and 576 lift the ball 30 from both sides. As the ball 30 moves in the travelling direction, and the distance L between the inclined surfaces 575 and 576 becomes narrower, the ball 30 is gradually raised.

"Effects"

When the ball 30 enters the end deflector 470 from the spiral grooves 22 and 42, as shown in FIG. 15(a) to FIG. 15(*c*), the inclined surfaces 575 and 576 lift the balls 30 from both sides. Then, the distance L between the inclined surfaces 575 and 576 becomes narrower as the ball 30 proceeds in the travelling direction, and eventually the ball 30 is raised. Thus, the ball 30 enters the passage 518 in the end deflector 470 without colliding with the tip of the claw portion 475.

If a structure including the two ball lifting portions 571 and 572 is employed as in the fourth embodiment, the impact generated when the ball contacts the ball lifting portions 571 and 572 is dispersed in two places. Therefore, even if the collision sound is generated upon contacting of the ball with the lifting portions 571 and 572, the collision sound is smaller than the collision sound when the ball contacts the conventional claw portion 475. Since the lifting portions 571 and 572 are located substantially 180 degrees opposite across the center p of the ball 30, the bouncing behavior of the ball 30 upon contacting the lifting portions 571 and 572 is also suppressed.

In addition, the ball lifting portions 571 and 572 of the fourth embodiment are located at outer positions in the radial direction of the axial line CL than the groove edge portion 22*b* of the spiral groove 22. In the conventional structure in which the ball 30 is scooped by the claw portion 475, the gap t for avoiding the contact must be set between the claw portion 475 and the spiral groove 22, and therefore, the collision angle with respect to the ball 30 (the intersection angle between the traveling direction of the ball 30 and the tangential direction at the collision portion of the ball 30) becomes large, and the collision sound tends to increase. In contrast, if the ball lifting portions 571 and 572 are located at outer positions in the radial direction of the axial line CL than the groove edge portion 22*b* of the spiral groove 22, and are configured to lift the ball 30, the collision angle of the ball lifting portions 571 and 572 to the ball 30 can be set very shallow with no necessity of considering any contact with the screw shaft 20. That is, the tip of each of the ball lifting portions 571 and 572 can be positioned substantially along the tangential direction of the spherical surface of the ball 30. Thus, it is possible to almost eliminate the occurrence of the collision sound.

Further, if the ball lifting portions 571 and 572 are configured to have a pair of inclined surfaces 575 and 576 such that each of the ball lifting portions 571 and 572 inclines and approaches toward the width center of the spiral groove 22 as each of the ball lifting portions 571 and 572 goes in the radially inward direction of the screw shaft 20, and the distance L between the ball lifting portions 571 and 572 becomes narrower as the ball moves in the ball traveling direction, then the ball lifting portions 571 and 572 can have a simple structure and smoothly lift the ball 30.

Further, as in the fourth embodiment, if the first member 473 is shaped to have a pair of thin plate portions 573 and 574, and the inclined surfaces 575 and 576 are formed on the thin plate portions 573 and 574, respectively, then designing the shape of the end deflector 470, which is divided into the first member 473 and the second member 474, becomes easy.

It should be noted that the ball screw device 10 and the vehicle steering apparatus 100 according to the present invention are not limited to the embodiments and can encompass other configurations as long as such other configurations can achieve the functions and effects of the present invention.

For example, the ball screw device 10 is not limited to the configuration used in the vehicle steering apparatus 100. The ball screw device 10 may be used in various types of industrial machines such as machine tools, transportation equipment, and the like.

For example, the vehicle steering apparatus 100 shown in FIG. 6 may be a steer-by-wire type steering apparatus or a steering apparatus for a self-driving car or an autonomous vehicle.

The steer-by-wire type steering apparatus is configured such that the steering wheel 111 and the wheel-turning axle 116 are mechanically separated from each other, the electric motor 133 generates the steering power in accordance with a steering amount of the steering wheel 111, and the steering power is transmitted to the wheel-turning axle 116 by the belt transmission mechanism 150.

The steering system for the autonomous vehicle has a configuration that does not include the steering wheel 111, the steering shaft 112, the universal shaft coupling 113, the input shaft 114, and the first transmission mechanism 115 of the steering system 110, and includes the electric motor 133 and the second transmission mechanism 134. The steering power generated by the electric motor 133 is transmitted to the wheel-turning axle 116 by the belt transmission mechanism 150 without the driver's steering, and the wheels 121 and 121 can be automatically steered.

Further, the transmission member 60 may have any suitable configuration as long as the transmission member can transmit the rotational force between the nut 40 and the transmission member 60. For example, a hollow input shaft or output shaft, which is provided in one of various drive sources such as an electric motor or an engine, may be used as the transmission member 60.

In the fourth embodiment, although the ball lifting portions 571 and 572 are formed on the first member 473, the ball lifting portions 571 and 572 may be formed on the second member 474.

The end deflector 470 is not necessarily divided into the first member 473 and the second member 474, i.e., the end deflector may be a one-piece member.

Furthermore, if the ball lifting portions 571 and 572 can smoothly guide the balls 30 into the passage 518 in the end deflector 470, there may be no claw portion 475 projecting into the spiral groove 22.

INDUSTRIAL APPLICABILITY

The ball screw device 10 and the vehicle steering apparatus 100 of the present invention are suitable for being mounted in an automobile.

REFERENCE NUMERALS AND SYMBOLS

10 Ball screw device
20 Screw shaft
21 Outer peripheral surface of the screw shaft
22 Threaded portion
30 Ball
40 Nut
41 Inner circumferential surface of the nut
42 Threaded portion
43 Thread groove
44 Large-diameter portion
44a Outer peripheral surface of the large-diameter portion
44b Opposing end faces
44c Second positioning portion.
45 Small-diameter portion
45a Outer peripheral surface of the small-diameter portion
48 Recess
50 Guide member
51 First surface
52 Second surface
55 End of the nut
56 First positioning portion
60 Transmission member
61 Fitting portion
61a inner peripheral surface of the fitting portion
62 Circulation passage
70 End deflector
100 Steering apparatus for a vehicle
116 Wheel-turning axle
121 Turning wheel
133 Electric motor
157 Driven pulley
571 Ball lifting portion
572 Ball lifting portion
CL Axial line of the nut
D1 Outer diameter of the large-diameter portion
D2 Outer diameter of the small-diameter portion
Dp Depth of the small-diameter portion relative to the large-diameter portion
Le Spacing between the guide members

The invention claimed is:

1. A ball screw device comprising:
a screw shaft having a threaded portion on an outer peripheral surface thereof;
a plurality of balls which are positioned so as to be capable of rolling on the threaded portion;
a nut having a cylindrical configuration which is connected to the threaded portion by the plurality of balls, the nut including a pair of large-diameter portions located at opposite ends thereof in the axial direction, and a small-diameter portion integrally formed between the pair of large-diameter portions and having a smaller diameter than the pair of large-diameter portions over the entire circumference of the small-diameter portion;
a pair of guide members which can be attached to and detached from an outer peripheral surface of the small-diameter portion in a radial direction, positioned with a predetermined distance apart from each other in the outer circumferential direction of the small-diameter portion, and extend between opposed end faces of the pair of large-diameter portions; and
a transmission member having a fitting portion that can fit over the pair of large-diameter portions such that the fitting portion fitting over the pair of large-diameter portions covers the pair of guide members while regulating displacement of the pair of large-diameter portions in a radially outward direction, the transmission member configured to define a circulation passage for the plurality of balls in cooperation with the small-diameter portion and the pair of guide members, and connected to the nut such that a rotational force can be transmitted between the nut and the transmission member.

2. The ball screw device according to claim 1, wherein each of the pair of guide members has a pair of first positioning portions at opposite ends thereof in a direction along an axial direction of the nut, and the pair of large-diameter portions have a plurality of second positioning portions on outer peripheral surfaces thereof such that the pairs of first positioning portions can be fitted in the plurality of second positioning portions from outside in a radial direction.

3. The ball screw device according to claim 2, wherein each of the pair of guide members includes:
a first surface configured to have a same curved surface as the outer peripheral surface of the small-diameter portion, and capable of contacting the outer peripheral surface of the small-diameter portion; and
a second surface configured to have a same curved surface as the inner peripheral surface of the fitting portion, and capable of contacting the inner peripheral surface of the fitting portion.

4. The ball screw device according to claim 2, wherein the pair of large-diameter portions have a pair of recesses in the outer peripheral surfaces thereof, respectively,
the ball screw device further comprises a pair of end deflectors which can be fitted individually in the pair of recesses from outside in a radial direction, respectively,
the pair of end deflectors communicate between a screw groove formed in a portion where the screw shaft and the nut are opposed, and opposite ends of the circulation passage, and
the fitting portion covers the pair of end deflectors while restricting the displacement of the pair of end deflectors in the radially outward direction.

5. A steering apparatus for a vehicle, comprising:
the ball screw device according to claim 2;
an electric motor for generating a steering driving force that is transmitted from the transmission member to the nut; and
a wheel-turning axle including the screw shaft and configured to turn at least one turning wheel of the vehicle.

6. The ball screw device according to claim 1, wherein each of the pair of guide members includes:
a first surface configured to have a same curved surface as the outer peripheral surface of the small-diameter portion, and capable of contacting the outer peripheral surface of the small-diameter portion; and a second surface configured to have a same curved surface as the inner peripheral surface of the fitting portion, and capable of contacting the inner peripheral surface of the fitting portion.

7. The ball screw device according to claim 6, wherein the pair of large-diameter portions have a pair of recesses in the outer peripheral surfaces thereof, respectively,
the ball screw device further comprises a pair of end deflectors which can be fitted individually in the pair of recesses from outside in a radial direction, respectively,
the pair of end deflectors communicate between a screw groove formed in a portion where the screw shaft and the nut are opposed, and opposite ends of the circulation passage, and
the fitting portion covers the pair of end deflectors while restricting the displacement of the pair of end deflectors in the radially outward direction.

8. A steering apparatus for a vehicle, comprising:
the ball screw device according to claim 3;
an electric motor for generating a steering driving force that is transmitted from the transmission member to the nut; and
a wheel-turning axle including the screw shaft and configured to turn at least one turning wheel of the vehicle.

9. The ball screw device according to claim 1, wherein the pair of large-diameter portions have a pair of recesses in the outer peripheral surfaces thereof, respectively,
the ball screw device further comprises a pair of end deflectors which can be fitted individually in the pair of recesses from outside in a radial direction, respectively,
the pair of end deflectors communicate between a screw groove formed in a portion where the screw shaft and the nut are opposed, and opposite ends of the circulation passage, and
the fitting portion covers the pair of end deflectors while restricting the displacement of the pair of end deflectors in the radially outward direction.

10. The ball screw device of claim 9, wherein each of the pair of end deflectors includes a pair of ball lifting portions provided across a width center of the threaded portion of the screw shaft, and
each said pair of ball lifting portions support the ball at two locations spaced in a width direction across the width center of the threaded portion to lift the ball from the threaded portion.

11. A steering apparatus for a vehicle, comprising:
the ball screw device according to claim 10;
an electric motor for generating a steering driving force that is transmitted from the transmission member to the nut; and
a wheel-turning axle including the screw shaft and configured to turn at least one turning wheel of the vehicle.

12. A steering apparatus for a vehicle, comprising:
the ball screw device according to claim 9;
an electric motor for generating a steering driving force that is transmitted from the transmission member to the nut; and
a wheel-turning axle including the screw shaft and configured to turn at least one turning wheel of the vehicle.

13. A steering apparatus for a vehicle, comprising:
the ball screw device according to claim 1;
an electric motor for generating a steering driving force that is transmitted from the transmission member to the nut; and
a wheel-turning axle including the screw shaft and configured to turn at least one turning wheel of the vehicle.

14. A ball screw device comprising:
a screw shaft having a threaded portion on an outer peripheral surface thereof;
a plurality of balls which are positioned so as to be capable of rolling on the threaded portion;
a nut having a cylindrical configuration which is connected to the threaded portion by the plurality of balls, the nut including a pair of large-diameter portions located at opposite ends thereof in the axial direction, and a small-diameter portion integrally formed between the pair of large-diameter portions and having a smaller diameter than the pair of large-diameter portions over the entire circumference of the small-diameter portion;
a pair of guide members which can be attached to and detached from an outer peripheral surface of the small-diameter portion in a radial direction, positioned with a predetermined distance apart from each other in the outer circumferential direction of the small-diameter portion, and extend between opposed end faces of the pair of large-diameter portions;
a transmission member having a fitting portion that can fit over the pair of large-diameter portions such that the fitting portion fitting over the pair of large-diameter portions covers the pair of guide members while regulating displacement of the pair of large-diameter portions in a radially outward direction, the transmission member configured to define a circulation passage for the plurality of balls in cooperation with the small-diameter portion and the pair of guide members, and the transmission member having a pulley which is serration-coupled to the nut; and
a pair of end deflectors communicating between a screw groove formed in a portion where the screw shaft and the nut are opposed, and opposite ends of the circulation passage,
wherein each of the pair of guide members has a pair of first positioning portions at opposite ends thereof in a direction along an axial direction of the nut, a first surface configured to have a same curved surface as the outer peripheral surface of the small-diameter portion, and capable of contacting the outer peripheral surface of the small-diameter portion, and a second surface configured to have a same curved surface as the inner peripheral surface of the fitting portion, and capable of contacting the inner peripheral surface of the fitting portion, wherein the pair of large-diameter portions have a plurality of second positioning portions on outer peripheral surfaces thereof such that the pairs of first positioning portions can be fitted in the plurality of second positioning portions from outside in a radial direction, and a pair of recesses into which the pair of end deflectors can be fitted individually from outside in a radial direction, and
wherein an inner peripheral surface of the fitting portion covers the pair of end deflectors while restricting the displacement of the pair of end deflectors in the radially outward direction.

15. A steering apparatus for a vehicle, comprising:
the ball screw device according to claim 14;
an electric motor for generating a steering driving force that is transmitted from the transmission member to the nut; and
a wheel-turning axle including the screw shaft and configured to turn at least one turning wheel of the vehicle.

* * * * *